(12) United States Patent
Yamaguchi

(10) Patent No.: US 8,842,335 B2
(45) Date of Patent: Sep. 23, 2014

(54) APPARATUS, METHOD, AND NON-TRANSITORY COMPUTER READABLE MEDIUM TO ACHIEVE APPROPRIATE COLOR REPRODUCTION CHARACTERISTICS

(75) Inventor: Takeshi Yamaguchi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 886 days.

(21) Appl. No.: 12/831,653

(22) Filed: Jul. 7, 2010

(65) Prior Publication Data
US 2011/0013210 A1  Jan. 20, 2011

(30) Foreign Application Priority Data
Jul. 16, 2009 (JP) ................................. 2009-167369

(51) Int. Cl.
*H04N 1/60* (2006.01)

(52) U.S. Cl.
USPC ............................ 358/1.9; 358/501; 358/518

(58) Field of Classification Search
USPC .................. 358/1.1, 1.9, 1.15, 500, 501, 518
See application file for complete search history.

(56) References Cited

U.S. PATENT DOCUMENTS

| | | | |
|---|---|---|---|
| 6,965,445 B2 | 11/2005 | Dimperio et al. | |
| 7,369,271 B2 * | 5/2008 | Itagaki | 358/1.9 |
| 7,900,146 B2 * | 3/2011 | Kozuka et al. | 715/733 |
| 7,978,369 B2 * | 7/2011 | Haikin | 358/1.9 |
| 2003/0133134 A1 | 7/2003 | Dimperio et al. | |
| 2007/0165271 A1 | 7/2007 | Kuwahara | |
| 2008/0291498 A1 * | 11/2008 | Yano et al. | 358/3.1 |
| 2009/0086295 A1 | 4/2009 | Murakami | |

FOREIGN PATENT DOCUMENTS

| | | |
|---|---|---|
| JP | 11-316669 | 11/1999 |
| JP | 2002-323960 A | 11/2002 |
| JP | 2003-216381 A | 7/2003 |
| JP | 2006-287356 | 10/2006 |
| JP | 2007-194857 A | 8/2007 |

OTHER PUBLICATIONS

English-language International Search Report from the European Patent Office mailed Jul. 14, 2011, for International Application No. EP 10 16 8675.
Office Action dated Jan. 31, 2012 issued in Chinese Counterpart Application No. 201010232171.9.
Xiaojie Xiu et al., "ICC Color Management Technique", Computer Institute in HangZhou Electronic Science and Technology University, Hangzhou, Zhejiang, 310018, pp. 1-9.
Office Action dated Mar. 21, 2012 issued in related Japanese Application No. 2011-134804.
Notification of Reasons for Refusal dated Apr. 19, 2011, which issued in Japanese Patent Application No. 2009-167369, along with English translation (8 pages).
Office Action issued in counterpart European Patent Application No. 10168675.6, mailing date Feb. 17, 2014 (6 pages).

* cited by examiner

*Primary Examiner* — Thomas D Lee
(74) *Attorney, Agent, or Firm* — Osha Liang LLP

(57) ABSTRACT

Disclosed is an information processing apparatus including: a control section to obtain output condition information to show an output condition when a color chart is output, to obtain colorimetric data obtained by measuring the color chart, to create a color conversion profile based on the obtained colorimetric data, and to embed the output condition information in the created color conversion profile according to an order determined in advance.

18 Claims, 14 Drawing Sheets

FIG.14

```
<TblCtrl>
  <Tbl kind="DEVICEPROFILE" nickname=" name " date="2007/09/10/01/23/45" memo="" >
    <Data>
      ICC PROFILE CONVERTED BY Base64
    </Data>
  </Tbl>
  <Tbl kind="PaperInfo" >
    <Data>
      category=1, color=1, gloss=2, weight=3
    </Data>
  </Tbl>
</TblCtrl>
```

102
103
104

APPARATUS, METHOD, AND NON-TRANSITORY COMPUTER READABLE MEDIUM TO ACHIEVE APPROPRIATE COLOR REPRODUCTION CHARACTERISTICS

CROSS-REFERENCE TO RELATED APPLICATIONS

The present U.S. patent application claims priority under the Paris Convention of Japanese Patent Application No. 2009-167369 filed on Jul. 16, 2009 to the Japanese Patent Office, which shall be a basis for correcting mistranslations.

BACKGROUND

1. Field of the Invention

The present invention relates to an information processing apparatus and a computer readable medium.

2. Description of Related Art

Generally, CMYK color specification system or RGB color specification system depends on color reproduction characteristic of an input/output device. For example, when a same piece of CMYK image data is printed as is on different printers, the color is reproduced differently according to the printer. Therefore, it is necessary to perform color conversion processing on image data to be output on a printer to meet the color reproduction characteristic to be aimed at. Conventionally, color conversion profile defined by International Color Consortium (ICC) is used in the color conversion processing. The color conversion profile is created based on colorimetric data obtained by outputting a color chart composed of a plurality of color patches on the printer which is the object of color matching and measuring the color chart.

Also, the color reproduction is different depending on the paper used for printing, and therefore a printing control method is proposed to detect the type of printing paper necessary for the printing data and the type of printing paper set in the printing apparatus and when the detected types of paper do not match, the color information included in the printing data is corrected to color information corresponding to the type of set printing paper (see Japanese Patent Application Laid-Open Publication No. H11-316669).

However, there is a problem that the color reproduction characteristic changes depending on the output condition when the color chart is output such as, paper type (paper quality, paper color, etc.) of the paper of the color chart. For example, when color conversion processing is performed according to paper type, a color chart is output with respect to each paper type used, and the color is measured to create the color conversion profile exclusive for the paper type and the paper type and the color conversion profile (color conversion table, color conversion matrix, color conversion curve, etc.) needed to be corresponded to each other in advance. Also, when printing is performed under output conditions other than those output conditions where the color conversion profile is already created, the color conversion profile needed to be made with a new output condition.

SUMMARY

The present invention has been made in consideration of the above problems, and it is one of main objects to select a color conversion profile suitable for an output condition.

An information processing apparatus reflecting one aspect of the present invention includes:

a control section to obtain output condition information to show an output condition when a color chart is output, to obtain colorimetric data obtained by measuring the color chart, to create a color conversion profile based on the obtained colorimetric data, and to embed the output condition information in the created color conversion profile according to an order determined in advance.

It is preferable that in the information processing apparatus, the output condition information further includes the paper type information to show the paper type of the paper on which the color chart is output.

It is preferable that the information processing apparatus further includes:

a communication section to perform transmitting and receiving of data with an external apparatus, wherein the control section obtains the output condition information from the external apparatus through the communication section.

It is preferable that the information processing apparatus further includes:

an operating section to receive operation input by a user, wherein the control section obtains the output condition information by input from the operating section.

It is preferable that in the information processing apparatus, the color conversion profile is an ICC profile; and the control section describes the output condition information in the private tag in the ICC profile to embed the output condition information in the ICC profile.

It is preferable that in the information processing apparatus, the color conversion profile is a structured document file; and the control section describes the output condition information in the tag for describing the output condition information in the structured document file to embed the output condition information in the structured document file.

It is preferable that in the information processing apparatus, the control section includes the output condition information in the file name of the color conversion profile to embed the output condition information in the color conversion profile.

An information processing apparatus reflecting one aspect of the present invention includes:

a control section to obtain a plurality of color conversion profiles embedded with first output condition information to show output condition when a color chart is output according to an order determined in advance, to extract first output condition information from each one of the obtained plurality of color conversion profiles, to compare the extracted first output condition information with second output condition information to show output condition of printing, to extract one or a plurality of color conversion profiles which match a filtering condition determined in advance from the obtained plurality of color conversion profiles, and to display the extracted one or a plurality of color conversion profiles on the display section so as to be selectable.

It is preferable that in the information processing apparatus, the first output condition information includes paper type information to show paper type of the paper on which the color chart is output; and the second output condition information includes paper type information to show the paper type of the paper which is an object of printing.

An information processing apparatus reflecting one aspect of the present invention includes:

a storage section to store a plurality of color conversion profiles embedded with first output condition information according to an order determined in advance to show an output condition when a color chart is output; and a control section to obtain printing data including second output condition information to show output condition in printing, to extract second output condition information from the printing data, to extract first output condition information from each of the plurality of color conversion profiles, to compare the first output condition information extracted from the plurality of color conversion profiles with the second output condition information extracted from the printing data, and to select a color conversion profile to be applied from the plurality of color conversion profiles.

It is preferable that in the information processing apparatus, the control section determines first output condition information with a closest approximation to the second output condition information extracted from the printing data from the first output condition information extracted from the plurality of color conversion profiles to select a color conversion profile to be applied.

It is preferable that in the information processing apparatus, the first output condition information includes paper type information to show paper type of paper on which the color chart is output; and the second output condition information includes paper type information to show paper type of paper which is an object of printing.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein;

FIG. 14 is an example of a description of an XML file.

DETAILED DESCRIPTION OF PREFERRED EMBODIMENTS

First Embodiment

First, the information processing apparatus of the first embodiment is described.

Figure 1:
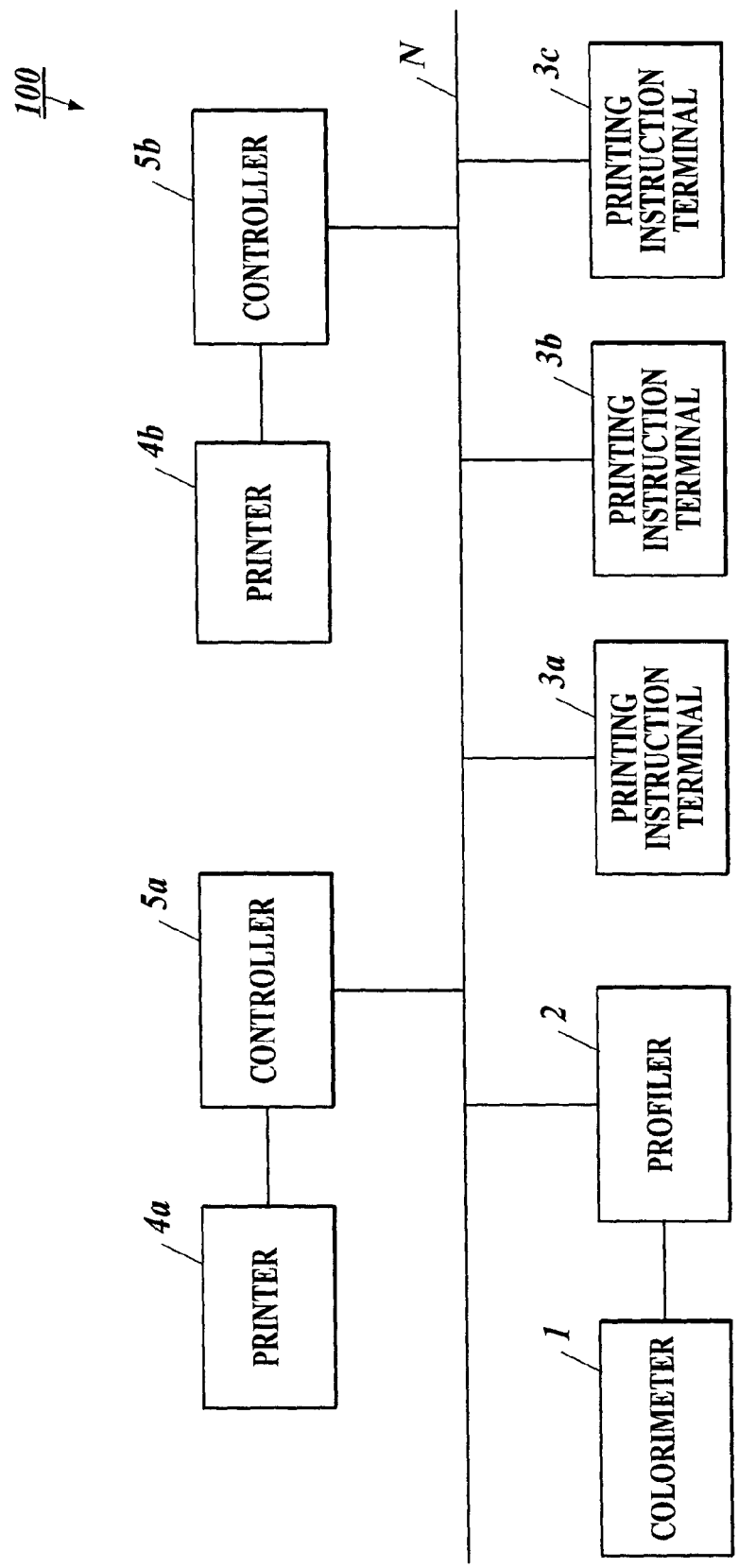
FIG. 1 is a system configuration diagram showing a printing system of the first embodiment.

FIG. 1 shows a system configuration of the printing system 100. As shown in FIG. 1, the printing system 100 includes a colorimeter 1, a profiler 2, printing instruction terminals 3a, 3b and 3c, printers 4a and 4b and controllers 5a and 5b. The profiler 2, the printing instruction terminals 3a, 3b and 3c and the controllers 5a and 5b are connected so as to be able to perform data communication through a communication network N such as an intranet.

The colorimeter 1 measures the color of the color patch of the plurality of colors included in the color chart output from the printers 4a and 4b and generates colorimetric data. The colorimetric data is represented by a color specification system which does not depend on a device such as L*a*b*, XYZ, etc.

The profiler 2 is composed of a typical personal computer (PC) and is an information processing apparatus to create a color conversion profile 232 (see FIG. 2) used in the controllers 5a and 5b. The profiler 2 performs output instruction of the color chart to the controllers 5a and 5b. The profiler 2 obtains colorimetric data of the color chart from the colorimeter 1 and creates a color conversion profile 232 based on the obtained colorimetric data and stores the color conversion profile 232. The profiler 2 transmits the color conversion profile 232 to the controllers 5a and 5b to allow the color conversion profile 232 to be stored.

The printing instruction terminals 3a, 3b and 3c are composed of a typical PC and are information processing apparatuses to perform a printing instruction to the printers 4a and 4b through the controllers 5a and 5b. The printing instruction terminals 3a, 3b and 3c are each installed with a printer driver program 331 (see FIG. 3) to perform printing instruction and specification of printing method. The printing instruction terminals 3a, 3b and 3c can perform a printing instruction by a printing controlling program, copying the file to a specified hot folder, etc.

The printers 4a and 4b perform printing processing using a specified paper type and tray based on the raster data received from the controllers 5a and 5b.

The controllers 5a and 5b are composed of a typical PC and are information processing apparatuses to perform processing such as color conversion processing, rasterizing processing, screening processing, etc. on the printing data received from the printing instruction terminals 3a, 3b and 3c to generate raster data. The controllers 5a and 5b transmit the raster data to the printers 4a and 4b.

A source profile 532 and a destination profile 533 (see FIG. 4) are stored as color conversion profiles in the controllers 5a and 5b.

The source profile 532 and the destination profile 533 are both profiles which describe two corresponding relations which are (1) a corresponding relation between an input CMYK value or an input RGB value and a color value of a common color space not depending on the input/output device such as an L*a*b* value or an XYZ value and (2) a corresponding relation between a color value of a common color space not depending on the input/output device such as an L*a*b* value or an XYZ value and a CMYK value depending on the output device. The corresponding relations are each described by a color conversion table (Look Up Table: LUT), etc.

Among the two corresponding relations, as for the source profile 532, the corresponding relation between an input CMYK value or an input RGB value and a color value of a common color space not depending on the input/output device such as an L*a*b* value or an XYZ value is used and as for the destination profile 533, a corresponding relation between a color value of a common color space not depending on the input/output device such as an L*a*b* value or an XYZ value and a CMYK value depending on the output device is used.

The color conversion profile 232 created by the profiler 2 is stored in the controllers 5a and 5b as the destination profile 533.

Instead of the source profile 532 and the destination profile 533, a device link profile can be stored in the controllers 5a and 5b.

The device link profile is a profile combining two profiles of a specific combination of one source profile 532 and one destination profile 533 and is a profile which describes a corresponding relation between the input CMYK value or the input RGB value and the CMYK value of the output device without a color space not depending on a device.

Figure 2:
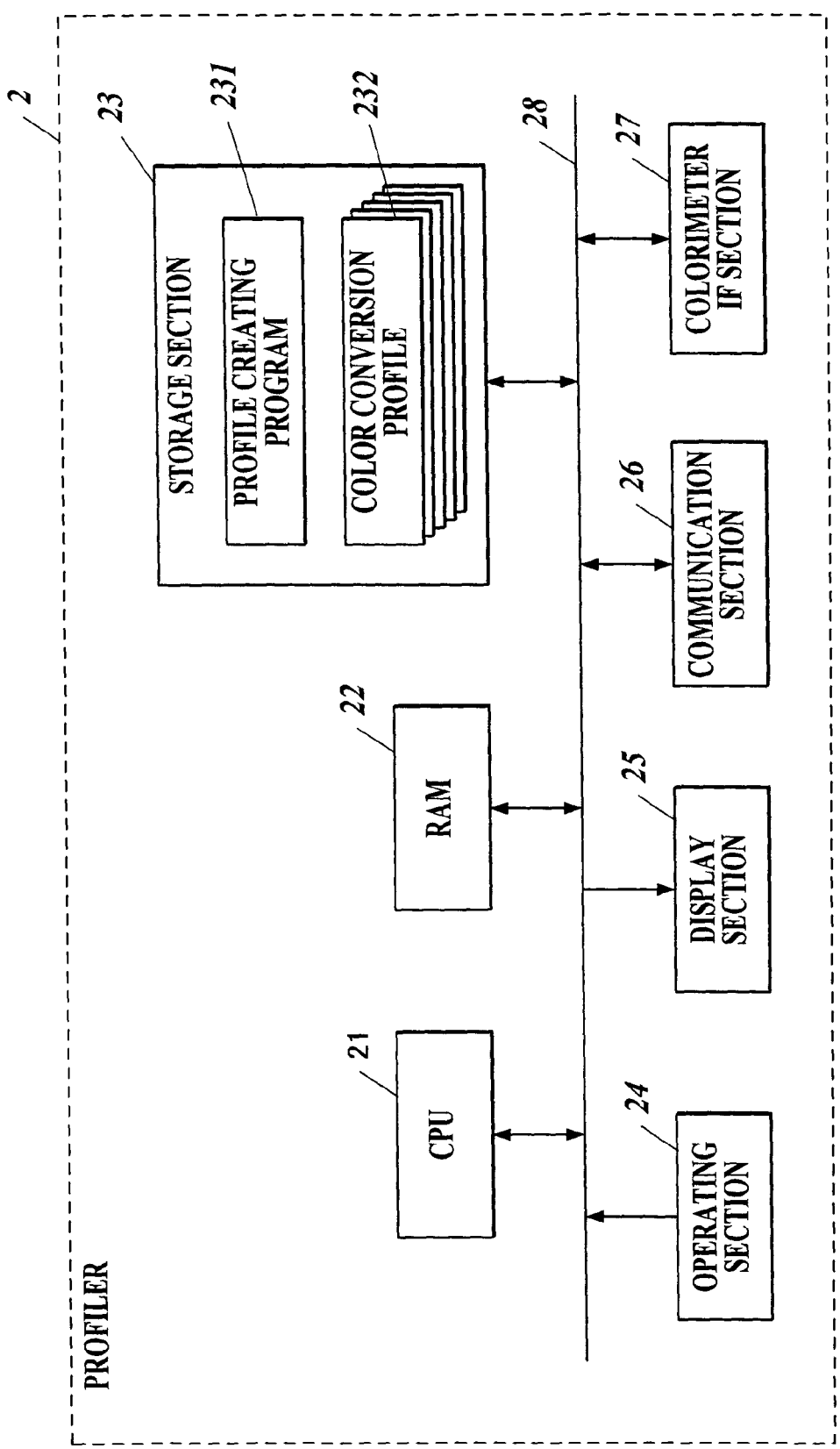
FIG. 2 is a block diagram showing a functional configuration of the profiler.

FIG. 2 shows a functional configuration of the profiler 2. As shown in FIG. 2, the profiler 2 is composed of a Central Processing Unit (CPU) 21, a Random Access Memory (RAM) 22, a storage section 23, an operating section 24, a display section 25, a communication section 26, a colorimeter IF section 27, etc. and each section is connected to each other through a bus 28.

The CPU 21 generally controls the processing operation of each section of the profiler 2. According to an operation signal input from the operating section 24 or the instruction signal received from the communication section 26, the CPU 21 reads out various processing programs stored in the storage section 23 and expands the programs to the RAM 22, and the CPU 21 performs various processing in conjunction with the programs.

The RAM 22 forms a work area to temporarily store various processing programs performed by the CPU 21 and data concerning these programs.

The storage section 23 is composed of a storage device such as a nonvolatile semiconductor memory, hard disk drive, etc., and stores various processing programs, data concerning the various processing, etc. For example, the storage section 23 stores a profile creating program 231, color conversion profile 232, etc.

The operating section 24 is composed of a keyboard including a cursor key, character input key, various function keys, etc., and a pointing device such as a mouse, etc., and receives operation input by the user. The operating section 24 outputs an operation signal input by key operation on the keyboard or mouse operation to the CPU 21.

The display section 25 includes an LCD (Liquid Crystal Display) and according to an instruction from the CPU 21, displays various operating screens and various processing results.

The communication section 26 performs data transmitting and receiving with the external apparatus through the communication network N. For example, the communication section 26 receives output condition information to show the output condition when the color chart is output from the controllers 5a and 5b. The communication section 26 transmits the color conversion profile 232 to the controllers 5a and 5b.

The colorimeter IF section 27 inputs and outputs data between the colorimeter 1. The colorimeter IF section 27 receives colorimetric data from the colorimeter 1.

When the CPU 21 automatically obtains output condition information to show the output condition when the color chart is output, the CPU 21 obtains the output condition information from the controllers 5a and 5b through the communication section 26. The output condition information to show the output condition when the color chart is output includes information which influence color reproduction such as paper type information to show paper type of the paper on which the color chart is output, screen type of the screening processing by the controllers 5a and 5b, individual identification number of printers 4a and 4b, temperature and humidity when the color chart is output, and the like.

When the CPU 21 does not automatically obtain the output condition information to show the output condition when the color chart is output, the CPU 21 obtains the output condition information input on the operating section 24.

The CPU 21 instructs the output of the color chart to the controllers 5a and 5b through the communication section 26. Specifically, the CPU 21 transmits to the controllers 5a and 5b printing instruction including image data of the color chart where a color patch of each of the CMYK value is arranged.

The CPU 21 controls the colorimeter 1 through the colorimeter IF section 27 and instructs measurement of the color chart output by the printers 4a and 4b (output device). The CPU 21 obtains the colorimetric data acquired by measuring the color chart with the colorimeter 1 from the colorimeter 1 through the colorimeter IF section 27.

The CPU 21 creates the color conversion profile 232 representing the color reproduction characteristic of the printers 4a and 4b based on the colorimetric data obtained from the colorimeter 1. The CPU 21 embeds output condition information based on a predetermined order to the created color conversion profile 232.

The CPU 21 transmits a color conversion profile 232 embedded with the output condition information to the controllers 5a and 5b connected to the printers 4a and 4b where the color charts are output and performs registration of the color conversion profile 232.

Figure 3:
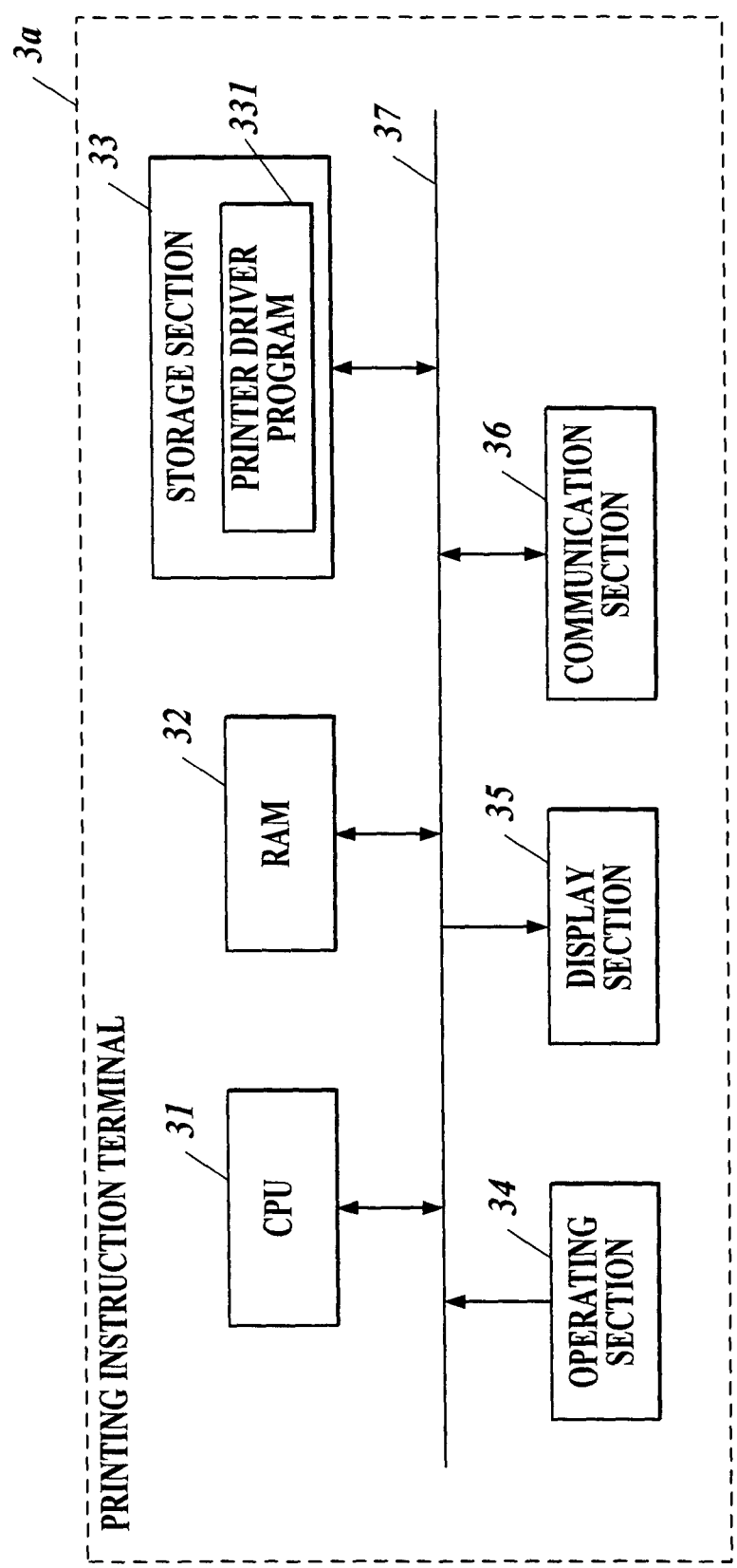
FIG. 3 is a block diagram showing a functional configuration of the printing instruction terminal.

FIG. 3 shows a functional configuration of the printing instruction terminal 3a. As shown in FIG. 3, the printing instruction terminal 3a includes a CPU 31, a RAM 32, a storage section 33, an operating section 34, a display section 35, a communication section 36, etc. and each section is connected to each other by a bus 37.

The CPU 31 generally controls the processing operation of each section of the printing instruction terminal 3a. According to an operation signal input from the operating section 34 or the instruction signal received from the communication section 36, the CPU 31 reads out various processing programs stored in the storage section 33 and expands the program to the RAM 32, and the CPU 31 performs various processing in conjunction with the programs.

The RAM 32 forms a work area to temporarily store various processing programs performed by the CPU 31 and data concerning these programs.

The storage section 33 is composed of a storage device such as a nonvolatile semiconductor memory, hard disk drive, etc., and stores various processing programs and data concerning the various processing. For example, the storage section 33 stores a printer driver program 331, etc.

The operating section 34 is composed of a keyboard including a cursor key, character input key, various function keys, etc., and a pointing device such as a mouse, etc., and receives operation input by the user. The operating section 34 outputs an operation signal input by key operation on the keyboard or mouse operation to the CPU 31.

The display section 35 includes an LCD and according to an instruction from the CPU 31, displays various operating screens and various processing results.

The communication section 36 performs data transmitting and receiving with the external apparatus through the communication network N. For example, the communication section 36 transmits the printing data to the controllers 5a and 5b.

According to operation on the operating section 34 by the user, the CPU 31 sets the source profile 532 (see FIG. 4) used in the color conversion processing on the controllers 5a and 5b.

According to operation on the operating section 34 by the user, the CPU 31 sets whether the destination profile 533 (see FIG. 4) used in the color conversion processing on the controllers 5a and 5b are set automatically or set manually.

When the destination profile 533 is set manually, the CPU 31 sets whether or not to activate the filtering function according to operation on the operating section 34 by the user. The filtering function is a function to set filtering conditions to narrow down the destination profile 533 as the candidate to be selected when one destination profile 533 is selected from a plurality of destination profiles 533.

When the filtering function is active, the CPU 31 obtains a plurality of destination profiles 533 from the controller 5a or the controller 5b connected to the printer 4a or the printer 4b on which the printing is performed. The CPU 31 extracts output condition information (first output condition information) from each of the obtained plurality of destination profiles 533. The CPU 31 compares each of the extracted output condition information with the output condition information (second output condition information) showing the output condition of printing and extracts one or a plurality of destination profiles 533 which matches the filtering condition determined in advance from the obtained plurality of destination profiles 533. The output condition information showing the output condition of printing includes information which influence color reproduction such as paper type information to show paper type of the paper which is the object of printing, screen type of the screening processing by the controllers 5a and 5b, individual identification number of printers 4a and 4b of the object to be printed, temperature and humidity when the printing is instructed and the like. A condition where a portion or all of the output condition information extracted from the destination profile 533 being the same as the output condition information showing the output condition of printing is set as the filtering condition. The CPU 31 displays the one or plurality of destination profiles 533 extracted based on the filtering condition on the display section 35 so as to be selectable. Then, the CPU 31 sets the destination profile 533 selected by the user among the destination profiles 533 displayed on the display section 35.

When the filtering function is not active, the CPU 31 obtains a plurality of destination profiles 533 from the controller 5a or the controller 5b connected to the printer 4a or printer 4b on which the printing is performed. The CPU 31 displays the obtained plurality of destination profiles 533 on the display section 35 to be selectable. Then, the CPU 31 sets the destination profile 533 selected by the user among the destination profiles 533 displayed on the display section 35.

When the CPU 31 performs a printing instruction to the controllers 5a and 5b, the CPU 31 generates printing data and transmits the generated printing data to the controllers 5a and 5b through the communication section 36.

The printing data includes the image data which shows the content to be printed and the printing setting information. The printing setting information includes the output condition information (second output condition information) showing the output condition of printing, color conversion setting information, etc. The color conversion setting information includes, information showing the set source profile 532, information showing whether the profile automatic setting of the destination profile 533 is active or not, etc. When the profile automatic setting of the destination profile 533 is not active, in other words, when the destination profile 533 is set manually, the color conversion setting information further includes information showing the set destination profile 533.

The printing instruction terminals 3b and 3c have a configuration similar to the printing instruction terminal 3a, and FIG. 3 is referred to and the illustration and the description of the configuration are omitted.

Figure 4:
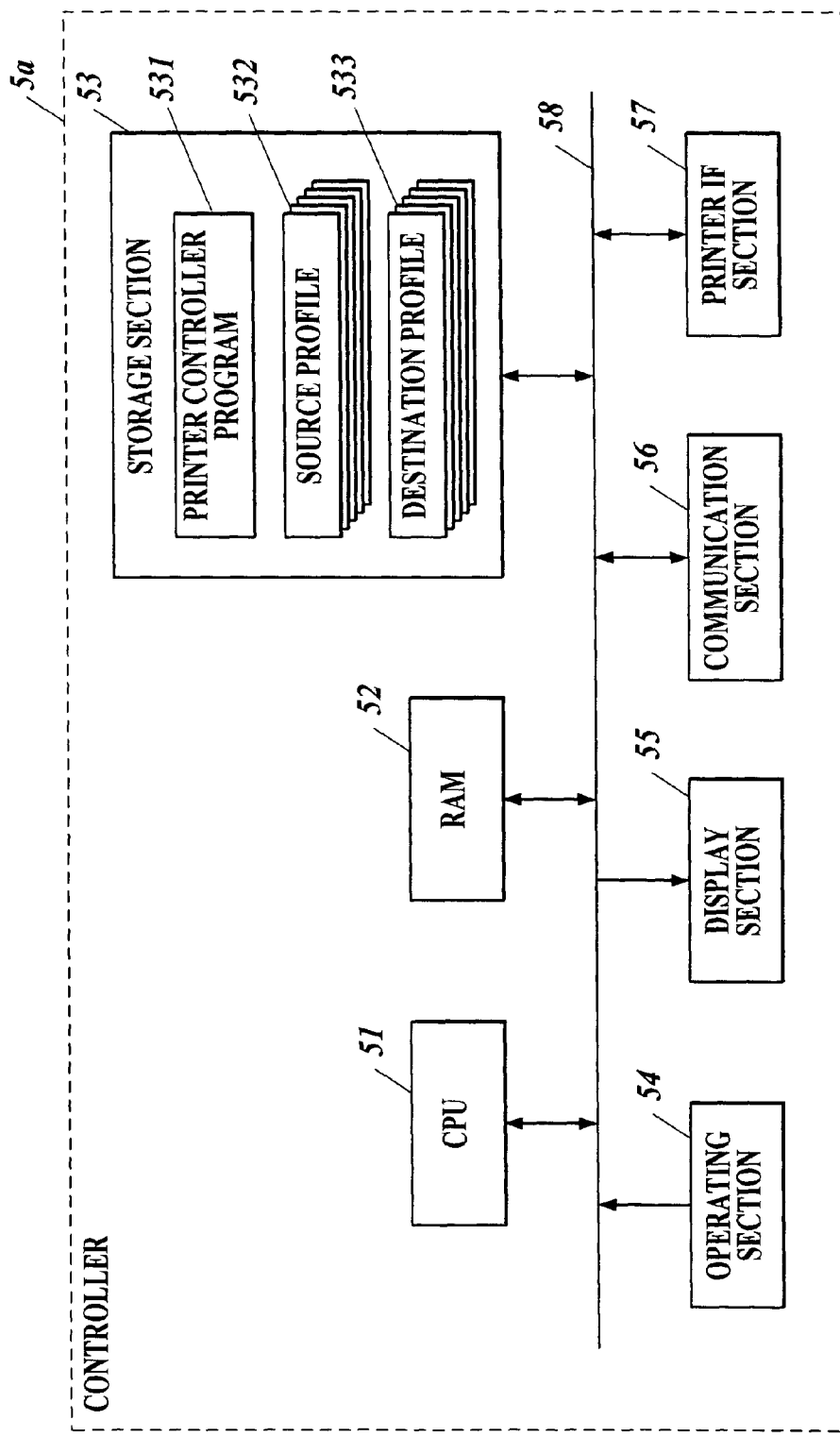
FIG. 4 is a block diagram showing a functional configuration of the controller.

FIG. 4 shows a functional configuration of the controller 5a. As shown in FIG. 4, the controller 5a includes a CPU 51, a RAM 52, a storage section 53, an operating section 54, a display section 55, a communication section 56, a printer IF section 57, etc., and each section is connected to each other by a bus 58.

The CPU 51 generally controls the processing operation of each section of the controller 5a. According to an operation signal input from the operating section 54 or the instruction signal received from the communication section 56, the CPU 51 reads out various processing programs stored in the storage section 53 and expands the programs to the RAM 52, and the CPU 51 performs various processing in conjunction with the programs.

The RAM 52 forms a work area to temporarily store various processing programs performed by the CPU 51 and data concerning these programs.

The storage section 53 is composed of a storage device such as a nonvolatile semiconductor memory, hard disk drive, etc., and stores various processing programs and data concerning the various processing. For example, the storage section 53 stores a printer controller program 531, source profile 532, destination profile 533, etc. The destination profile 533 corresponds to the color conversion profile 232 created by the profiler 2. In other words, the destination profile 533 is embedded with output condition information (first output condition information) showing an output condition when the color chart is output according to a predetermined order. Also, the storage section 53 stores paper type information showing the paper type of the sheet stored in each paper feeding tray of the printer 4a.

The operating section 54 is composed of a keyboard including a cursor key, character input key, various function keys, etc., and a pointing device such as a mouse, etc., and receives operation input by the user. The operating section 54 outputs an operation signal input by key operation on the keyboard or mouse operation to the CPU 51.

The display section 55 includes an LCD and according to an instruction from the CPU 51, displays various operating screens and various processing results.

The communication section 56 performs data transmitting and receiving with the external apparatus through the communication network N. For example, the communication section 56 receives the color conversion profile 232 from the profiler 2. Also, the communication section 56 receives the printing data from the printing instruction terminals 3a, 3b and 3c.

The printer IF section 57 performs input and output of data with the printer 4a. The printer IF section 57 transmits raster data to the printer 4a.

The CPU 51 obtains printing data from the printing instruction terminals 3a, 3b and 3c through the communication section 56.

The CPU 51 reads the set source profile 532 based on the color conversion setting information included in the printing data from the storage section 53 to the RAM 52.

When the profile automatic setting of the destination profile 533 is active in the color conversion setting information included in the printing data, the CPU 51 extracts the output condition information (second output condition information) showing the output condition of printing from the printing data.

The CPU 51 extracts output condition information (first output condition information) from each one of the plurality of destination profiles 533 (color conversion profile) stored in the storage section 53. The CPU 51 compares each of the output condition information extracted from the plurality of destination profiles 533 with the output condition information extracted from the printing data and selects the destination profile 533 to be applied from the plurality of destination profiles 533. Specifically, the CPU 51 determines the output condition information which is the closest approximation to the output condition information extracted from the printing data among each of the output condition information extracted from the plurality of destination profiles 533 to select the destination profile 533 to be applied. Then, the CPU 51 reads the selected destination profile 533 from the storage section 53 to the RAM 52.

Alternatively, when the profile automatic setting of the destination profile 533 in the color conversion setting information included in the printing data is not active, the CPU 51 reads the set destination profile 533 from the storage section 53 to the RAM 52.

In conjunction with the color conversion program, the CPU 51 realizes a Color Management Module (CMM) which performs color conversion processing. The CPU 51 uses the source profile 532 and the destination profile 533 read to the RAM 52 to create the color conversion table and to perform the color conversion processing.

The CPU 51 performs the RIP processing on the image data after the color conversion processing to generate raster data. Then, the CPU 51 transmits the raster data to the printer 4a through the printer IF section 57.

The controller 5b is a configuration similar to the controller 5a, and FIG. 4 is referred to and the illustration and the description of the configuration are omitted.

Below, an example where the paper type information is used as the output condition information is described.

The paper type information includes four elements which are paper category, paper color, gloss, and basis weight. A match or approximation of the paper type is determined using the paper type information. The number of elements composing the paper type information is not limited to the above.

The paper category shows the paper quality of the paper and is classified to the attributes of "plain paper" "color copying paper", "high quality paper" and "coated paper".

The paper color shows the color of the paper and is classified to the attributes of "white", "yellow" and "others".

The gloss shows whether or not there is gloss on the paper and is classified to the attributes of "gloss" and "no gloss"

The basis weight (g/m$^2$) shows the weight of the paper per unit area and is classified to the attributes of "up to 60", "61 to 90", "91 to 120", "121 to 140", "141 or more".

In order to easily judge the paper type, each element is converted to a number. Here, it is preferable that the similar attributes within the elements have values (attribute code) which are as close as possible, for example, as for basis weight, aligned in an order from the light attribute.

Table 1 shows the attribute of the paper category and an attribute code corresponding to the attribute.

TABLE 1

| | PAPER CATEGORY | | | |
| --- | --- | --- | --- | --- |
| | PLAIN PAPER | COLOR COPYING PAPER | HIGH QUALITY PAPER | COATED PAPER |
| ATTRIBUTE CODE | 1 | 2 | 3 | 4 |

Table 2 shows the attribute of the paper color and an attribute code corresponding to the attribute.

TABLE 2

| PAPER COLOR | WHITE | YELLOW | OTHERS |
| --- | --- | --- | --- |
| ATTRIBUTE CODE | 1 | 2 | 3 |

Table 3 shows the attribute of the gloss and the attribute code corresponding to the attribute.

TABLE 3

| GLOSS | GLOSS | NO GLOSS |
| --- | --- | --- |
| ATTRIBUTE CODE | 1 | 2 |

Table 4 shows the attribute of the basis weight and the attribute code corresponding to the attribute.

TABLE 4

| | BASIS WEIGHT | | | | |
| --- | --- | --- | --- | --- | --- |
| | -60 | 61-90 | 91-120 | 121-140 | 141- |
| ATTRIBUTE CODE | 1 | 2 | 3 | 4 | 5 |

Next, the operation is described.

Figure 5:
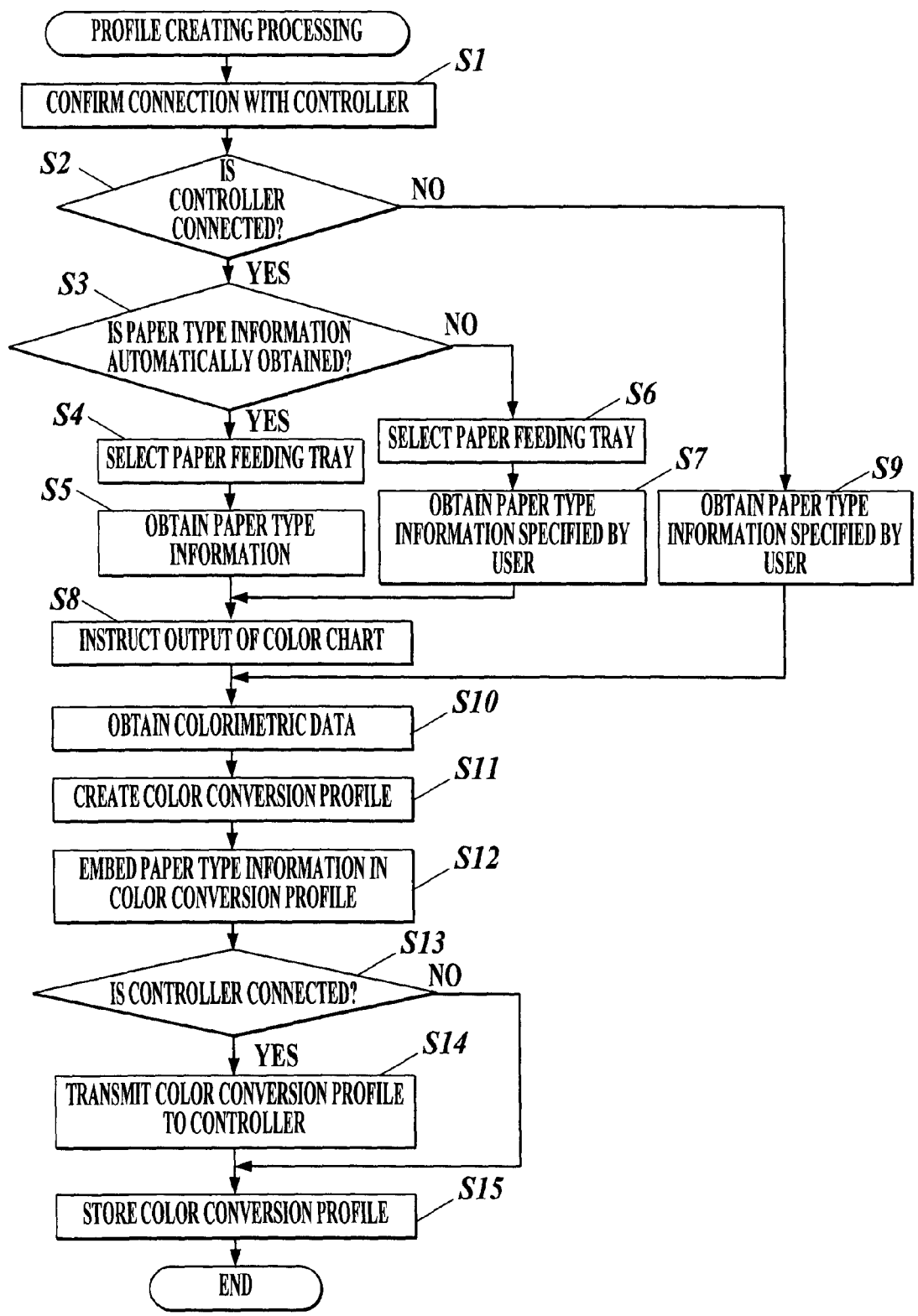
FIG. 5 is a flowchart showing a profile creating processing performed on the profiler.

FIG. 5 shows a flowchart of the profile creating processing performed in the profiler 2. The profile creating processing is a processing to create a color conversion profile 232 based on the output color chart and to embed the paper type information in the color conversion profile 232. The profile creating processing is realized by software processing by the CPU 21 in conjunction with the profile creating program 231 stored in the storage section 23.

First, the CPU 21 checks the connection with the controllers 5a and 5b when the profiler 2 is started (step S1). Specifically, the CPU 21 automatically searches on the communication network N the controllers 5a and 5b which can be connected to and displays the result on the display section 25. Then, the controllers 5a and 5b connected to the printers 4a and 4b on which the color charts are output is selected from the controllers 5a and 5b displayed on the display section 25 by operation by the user on the operating section 24. The controllers 5a and 5b can be selected by specifying any IP address by operation by the user on the operating section 24. Also, when the color chart is not output through the controllers 5a and 5b or the color is measured using a color chart already printed, the connection with the controllers 5a and 5b do not have to be performed.

Figure 6:
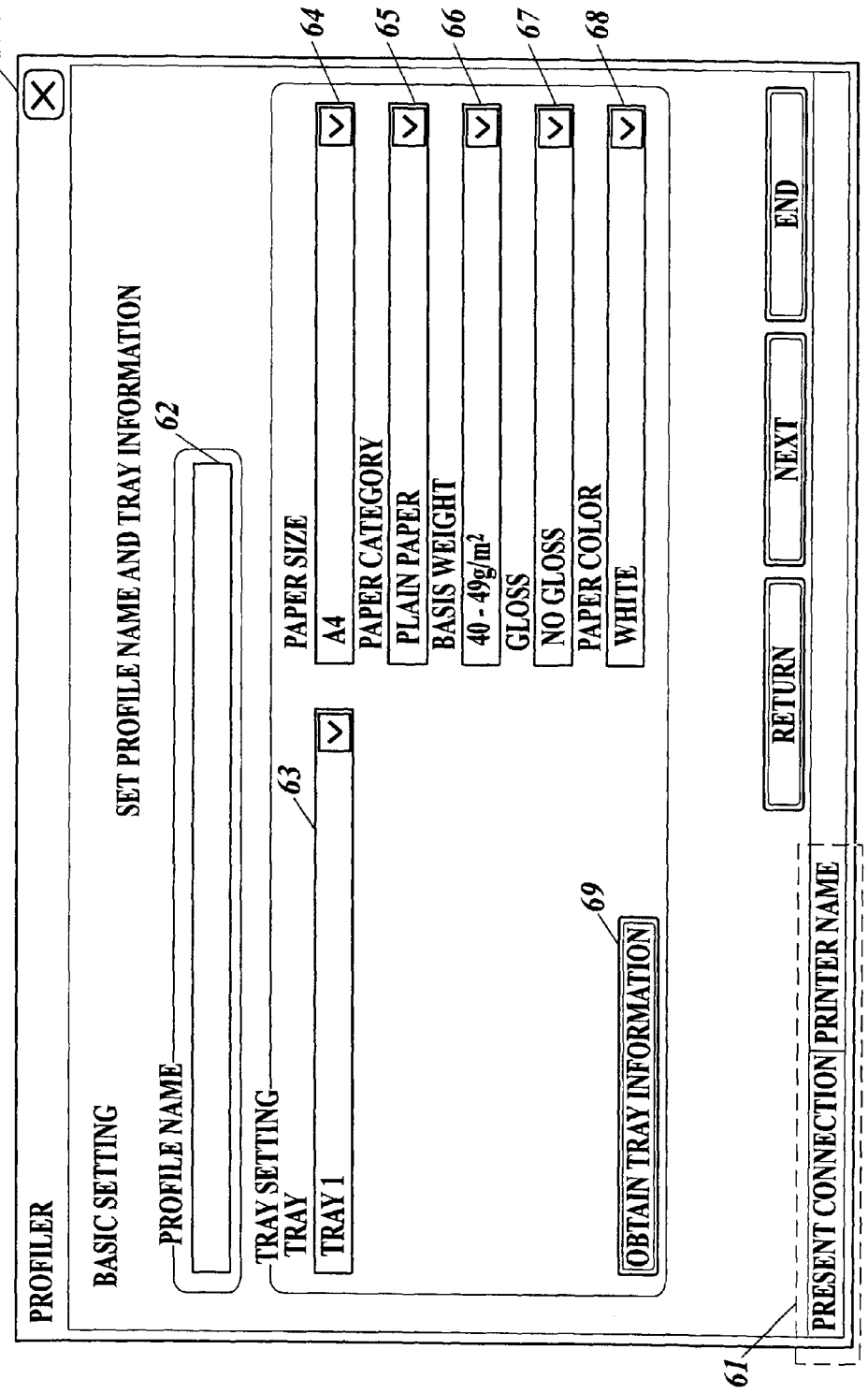
FIG. 6 is an example of a paper type information setting screen.

FIG. 6 shows an example of a paper type information setting screen 251 displayed on the display section 25 of the profiler 2. The paper type information setting screen 251 includes a printer name display area 61, a profile name setting area 62, a tray setting area 63, a paper size setting area 64, a paper category setting area 65, a basis weight setting area 66, a gloss setting area 67, a paper color setting area 68, a tray information obtaining button 69, etc.

The printer name display area 61 displays the printer names of the printers 4a and 4b to which the profiler 2 is connected at the present when the profiler 2 is connected to the printers 4a and 4b through the controllers 5a and 5b. The profiler 2 can perform the output instruction of the color chart to the printers 4a and 4b to which the profiler 2 is connected.

The profile name setting area 62 is an area to set the profile name. The user inputs the name given to the created color conversion profile 232 on the profile name setting area 62 by operation on the operating section 24.

The tray setting area 63 is an area to set the paper feeding tray storing the paper used in the output of the color chart on the connected printers 4a and 4b. The user specifies the paper feeding tray in which the paper used for color chart output is stored on the tray setting area 63 by operation on the operating section 24.

The paper size setting area 64 is an area to set the paper size of the paper used in the color chart output. The user specifies the paper size of the paper used in the color chart output on the paper size setting area 64 by operation on the operating section 24.

The paper category setting area 65 is an area to set the paper category of the paper used in the color chart output. The user specifies the paper category of the paper used in the color chart output on the paper category setting area 65 by operation on the operating section 24.

The basis weight setting area 66 is an area to set the basis weight of the paper used in the color chart output. The user specifies the basis weight of the paper used in the color chart output on the basis weight setting area 66 by operation on the operating section 24.

The gloss setting area 67 is an area to set gloss of the paper used in the color chart output. The user specifies the gloss of the paper used in the color chart output on the gloss setting area 67 by operation on the operating section 24.

The paper color setting area 68 is an area to set the paper color of the paper used in the color chart output. The user specifies the paper color of the paper used in the color chart output on the paper color setting area 68 by operation on the operating section 24.

The tray information obtaining button 69 is a button to obtain the paper type information of the paper stored in the paper feeding tray set on the tray setting area 63.

When the profiler 2 is connected to the controllers 5a and 5b (step S2; YES) and the paper type information when the color chart is output is automatically obtained (step S3; YES), the CPU 21 selects the paper feeding tray of the printers 4a and 4b on which the color chart is output according to operation by the user on the operating section 24 (step S4). Specifically, the paper feeding tray is specified from the operating section 24 on the tray setting area 63 of the paper type information setting screen 251 displayed on the display section 25.

After the user specifies the paper feeding tray on the tray setting area 63, when the tray information obtaining button 69 is pressed by the operation on the operating section 24, the CPU 21 automatically obtains the paper type information of the selected paper feeding tray (paper type information of the paper used in the color chart output) from the controllers 5a and 5b through the communication section 26 (step S5). Specifically, the CPU 21 transmits an obtaining request of the paper type information of the selected paper feeding tray to the controllers 5a and 5b through the communication section 26 and obtains the paper type information transmitted from the controllers 5a and 5b through the communication section 26. The obtained paper type information is displayed by the CPU 21 in the paper size setting area 64, the paper category setting area 65, the basis weight setting area 66, the gloss setting area 67 and the paper color setting area 68. When there is a function to automatically select the paper feeding tray on the controllers 5a and 5b, the selection of the paper feeding tray can be performed automatically.

When the profiler 2 is connected to the controllers 5a and 5b (step S2; YES) and the paper type information in color chart output cannot be obtained automatically (step S3; NO), the CPU 21 selects the paper feeding tray of the printers 4a and 4b to output the color chart based on the operation on the operating section 24 by the user (step S6). Specifically, the paper feeding tray is specified on the operating section 24 in the tray setting area 63 of the paper type information setting screen 251 displayed on the display section 25.

Next, the CPU 21 obtains the paper type information (paper type information of the paper used in the color chart output) specified on the operating section 24 by the user (step S7). Specifically, the paper size, the paper category, the basis weight, the gloss and the paper color are specified on the operating section 24 in the paper size setting area 64, the paper category setting area 65, the basis weight setting area 66, the gloss setting area 67 and the paper color setting area 68 of the paper type information setting screen 251 displayed on the display section 25.

After step S5 or step S7, according to the obtained paper type information, the CPU 21 transmits the output instruction of the color chart to the controllers 5a and 5b through the communication section 26 (step S8). Then, the printers 4a and 4b output the color chart using the paper according to the paper type information.

In step S2, when the profiler 2 is not connected to the controllers 5a and 5b (step S2; NO), the CPU 21 obtains the paper type information when the color chart is output which is specified on the operating section 24 by the user (step S9). Then, the color chart set in advance is prepared.

After step S8 or step S9, the color chart output from the printers 4a and 4b based on the output instruction in step S8 or the color chart set in advance is measured by the colorimeter 1 to obtain the colorimetric data and the CPU 21 obtains the colorimetric data through the colorimeter IF section 27 (step S10).

Figure 7:
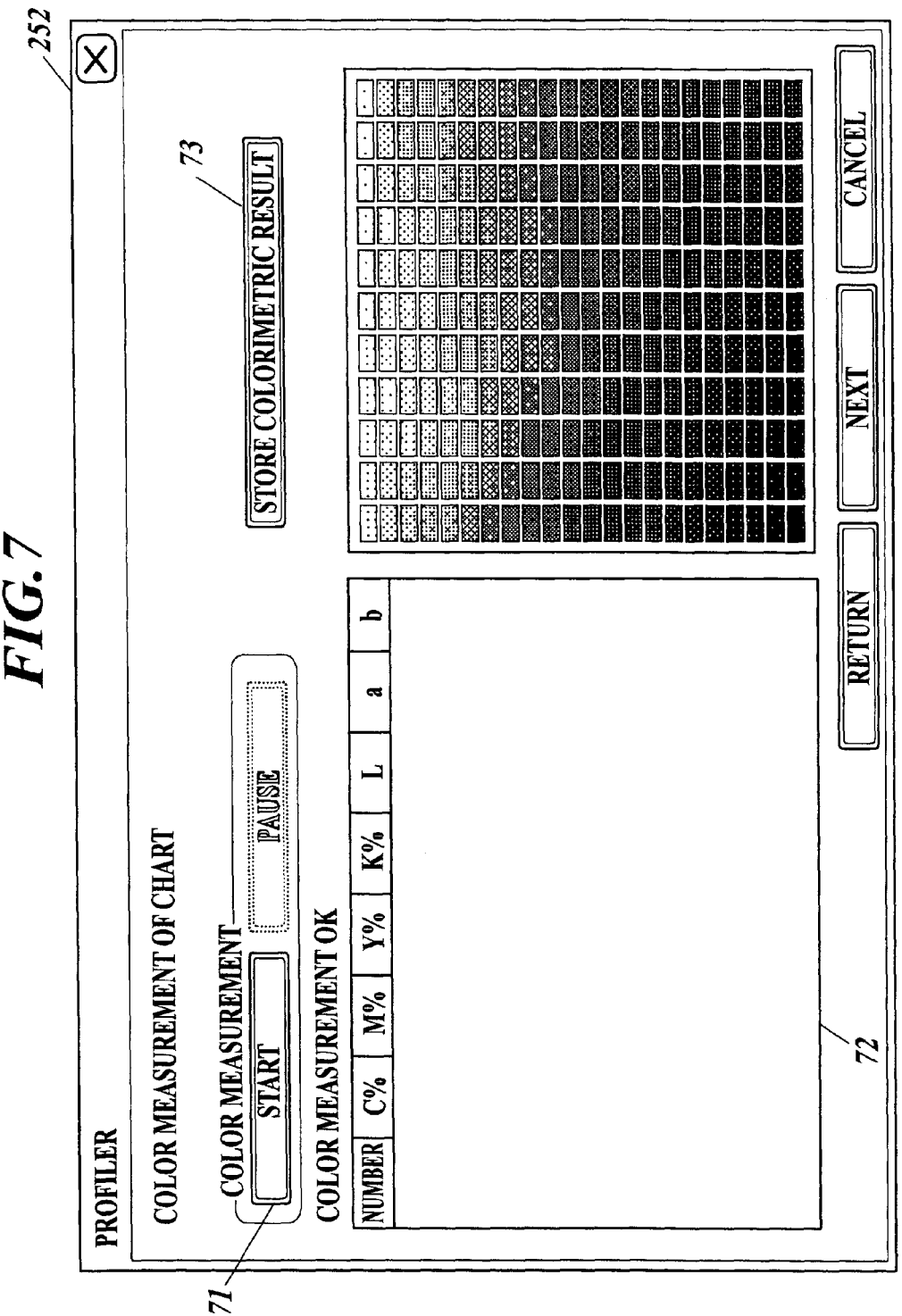
FIG. 7 is an example of a color chart color measurement screen.

FIG. 7 shows an example of a color chart color measurement screen 252 displayed on the display section 25 of the profiler 2. The color chart color measurement screen 252 includes a start button 71, a colorimetric result displaying area 72, a save button 73, etc.

The start button 71 is a button to instruct commencement of the color measurement of the color chart by the colorimeter 1. The user operates the operating section 24 by pressing the start button 71 to instruct commencement of the color measurement of the color chart.

The colorimetric result displaying area 72 is an area to display the result of the measured color chart. The colorimetric result displaying area 72 displays input data (CMYK value) of each color patch in the color chart and corresponding colorimetric result (L*a*b*value).

The save button 73 is a button pressed when the colorimetric result is saved. The user operates the operating section 24 to press the save button 73 and instructs the colorimetric result to be saved. The colorimetric result is used in the calculation of the color conversion profile 232. Also, the colorimetric result is used in analysis such as calculation of color difference, etc.

Next, the CPU 21 creates the color conversion profile 232 representing the color reproduction characteristic of the printers 4a and 4b based on the colorimetric data (step S11).

Next, the CPU 21 converts the paper type information to a form which can be embedded in the color conversion profile 232 and the paper type information is embedded in the color conversion profile 232 (step S12).

In the first embodiment, an example where an ICC profile based on the ICC specification is created as the color conversion profile 232 is described.

Figure 8:
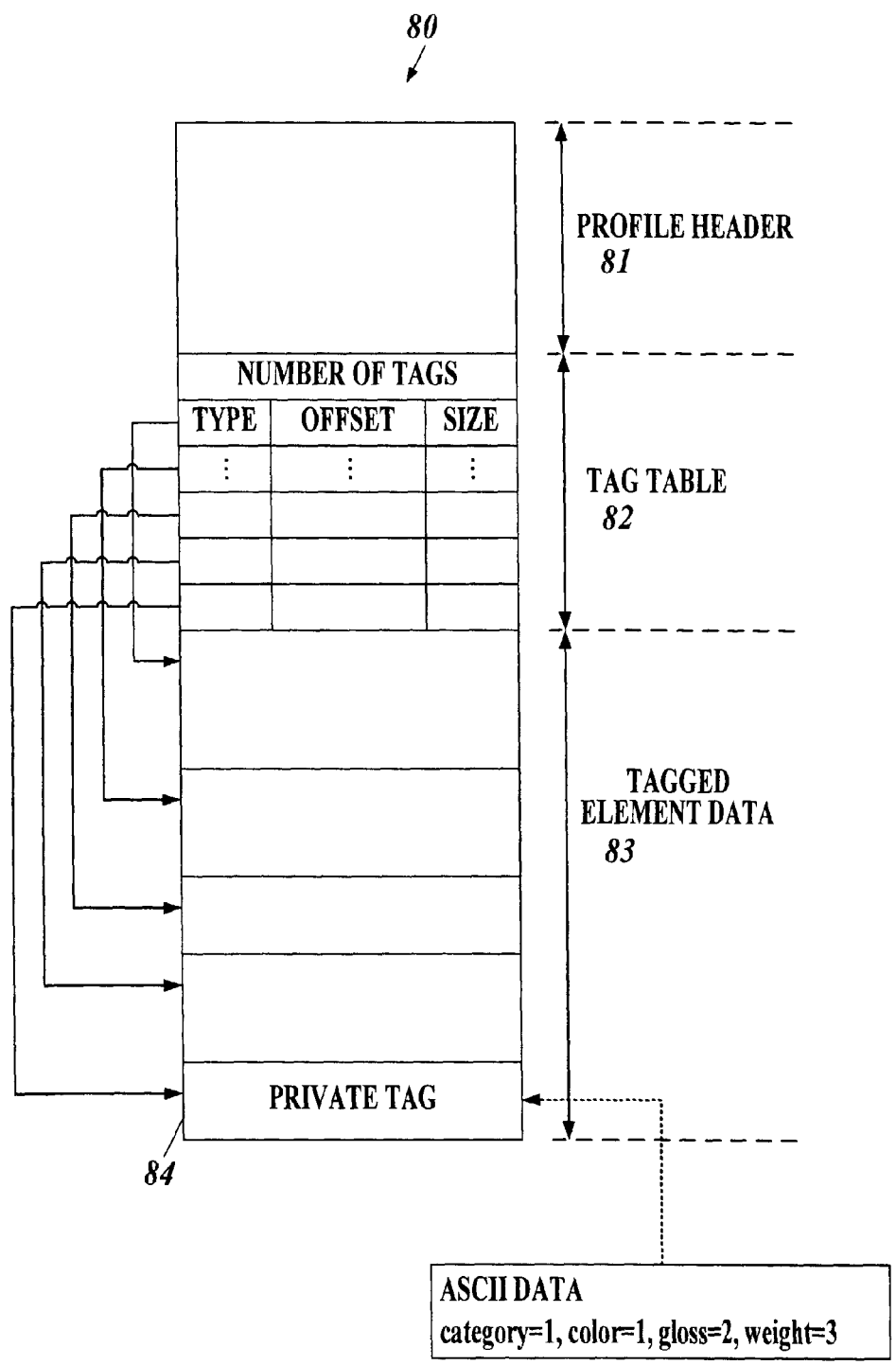
FIG. 8 is a diagram showing a data configuration of an ICC profile.

FIG. 8 shows a data configuration of the ICC profile 80. The ICC profile 80 is composed of a profile header 81, tag table 82 and tagged element data 83.

Various information of the profile is described in the profile header 81.

A list of the elements composing the profile is described in the tag table 82. Specifically, tag number, type with respect to tag (type such as LUT, GAMUT information, etc.), offset (information showing starting address of tag) and size are described.

Content of each tag (content such as LUT, GAMUT information, etc.) is described in the tagged element data 83. Among the tagged element data 83, the paper type information is described in the private tag 84. The data description method can be an ASCII character string as shown in FIG. 8 or a binary format. In the example shown in FIG. 8, "category=1, color=1, gloss=2, weight=3" is described in the private tag 84. This shows the paper category is "plain paper", the paper color is "white" the gloss is "no gloss" and the basis weight is "91 to 120" (See Table 1 to Table 4). In other words, in the first embodiment, the paper type information is embedded in the ICC profile 80 by describing the attribute corresponding to each element of the paper type information with the attribute code in the private tag 84 of the ICC profile 80.

Next, when the profiler 2 is connected to the controllers 5a and 5b (step S13; YES), the CPU 21 transmits the color conversion profile 232 to the controllers 5a and 5b (step S14) and stores the color conversion profile 232 in the storage section 23 (step S15). In the controllers 5a and 5b, the CPU 51 stores the color conversion profile 232 transmitted from the profiler 2 as the destination profile 533 in the storage section 53.

In step S13, when the profiler 2 is not connected to the controllers 5a and 5b (step S13; NO), the CPU 21 stores the color conversion profile 232 in the storage section 23 (step S15). Then, later, the user manually uploads the color conversion profile 232 to the controllers 5a and 5b.

With this, the profile creating processing ends.

Figure 9:
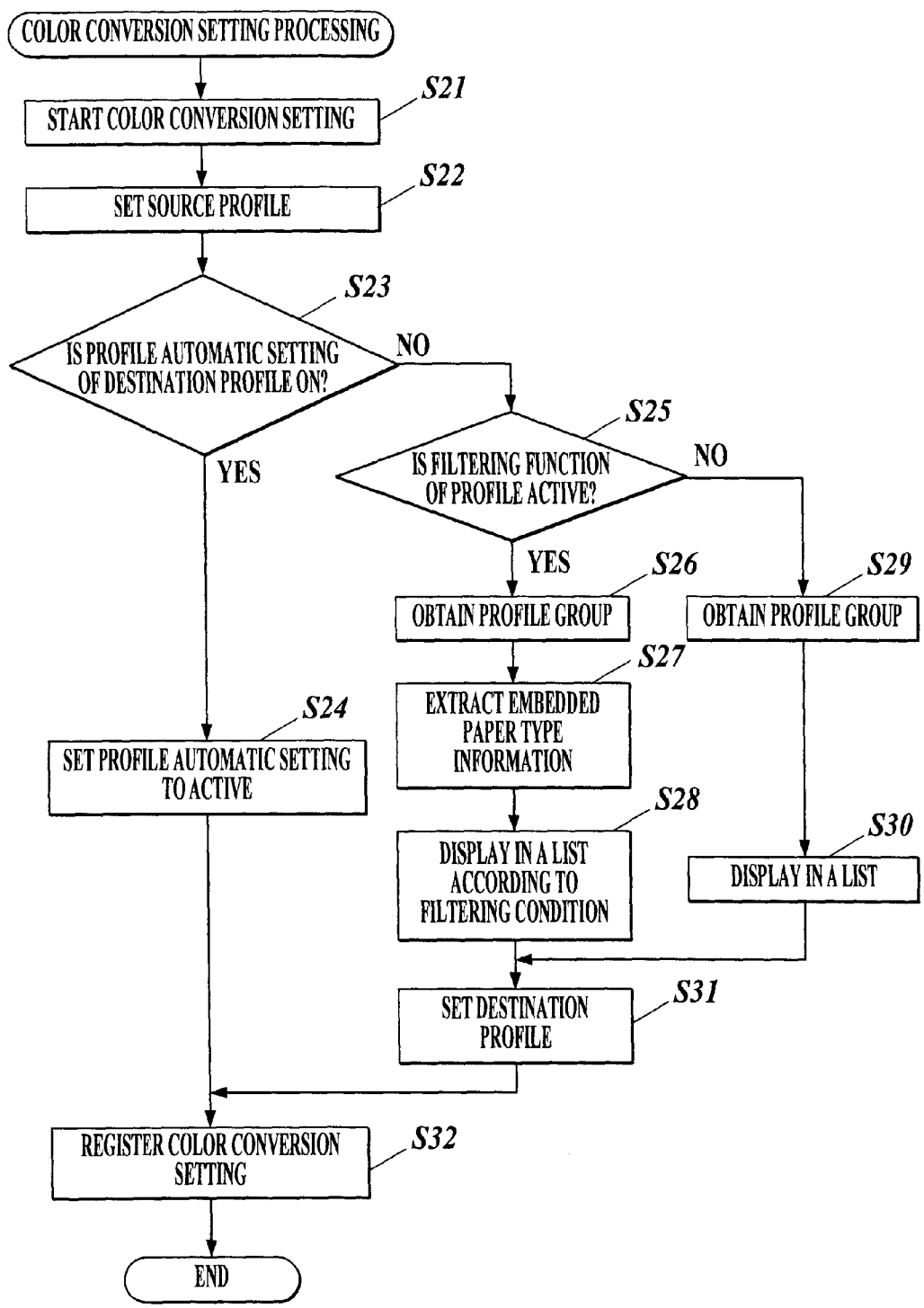
FIG. 9 is a flowchart showing a color conversion setting processing performed on the printing instruction terminal.

FIG. 9 shows a flowchart of the color conversion setting processing performed when printing is instructed on the printing instruction terminal 3a. Here, an example when the color conversion setting processing is performed on the controller 5a from the printing instruction terminal 3a is described. The same is applied when the color conversion setting processing is performed on the controller 5b from the printing instruction terminal 3a or the color conversion setting processing is performed on the controllers 5a and 5b from the printing instruction terminals 3b and 3c. The color conversion setting processing is realized by the CPU 31 by software processing in conjunction with the printer driver program 331 stored in the storage section 33.

First, the CPU 31 starts the setting of the color conversion (step S21).

Figure 10:
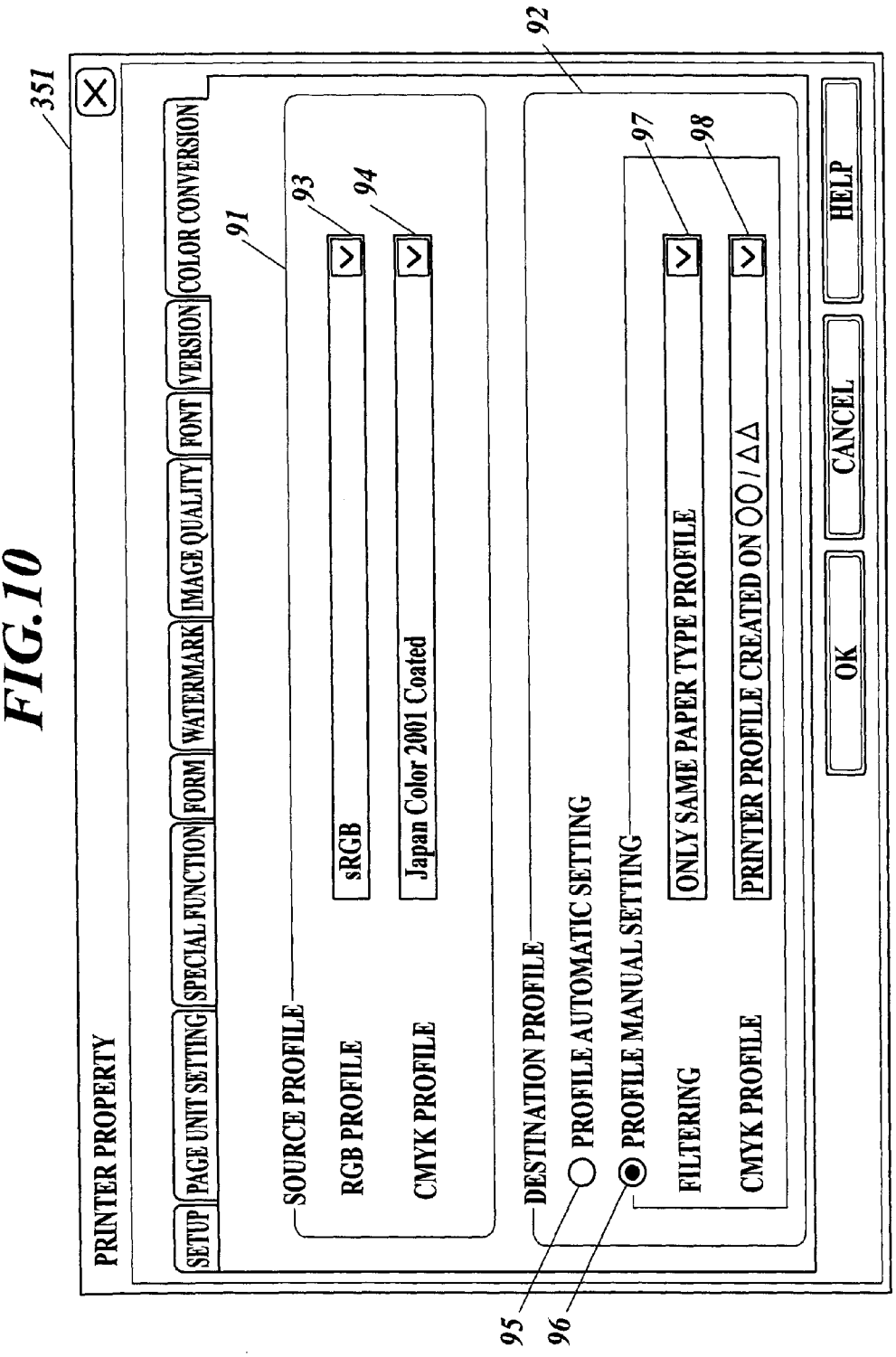
FIG. 10 is an example of a color conversion setting screen.

FIG. 10 shows an example of a color conversion setting screen 351 displayed on the display section 35 of the printing description terminal 3a. Here, an example where two device profiles (source profile 532, destination profile 533) are set on the printing setting on the printer driver as the color conversion setting is described. When the device link profile is used, both of the source profile 532 and the destination profile 533 do not have to be set and the portion corresponding to the destination profile 533 can be replaced by only the device link profile.

As shown in FIG. 10, the color conversion setting screen 351 includes a source profile setting area 91, destination profile setting area 92, etc. The source profile setting area 91 is an area to set the source profile 532 and the destination profile setting area 92 is the area to set the destination profile 533.

The source profile setting area 91 includes an RGB profile setting area 93 and a CMYK profile setting area 94.

The RGB profile setting area 93 is an area to set the source profile 532 when the RGB data is input. The user operates the operating section 34 to specify on the RGB profile setting area 93 the source profile 532 when the RGB data is input.

The CMYK profile setting area 94 is an area to set the source profile when the CMYK data is input. The user operates the operating section 34 to specify on the CMYK profile setting area 94 the source profile when the CMYK data is input.

The destination profile setting area 92 includes a profile automatic setting button 95, a profile manual setting button 96, a filtering setting area 97, and a CMYK profile setting area 98.

The profile automatic setting button 95 and the profile manual setting button 96 is a button to select whether to set the destination profile 533 automatically or manually by setting either one of the buttons to ON. When the profile automatic setting button 95 is set to ON, the controller 5a automatically sets the most suitable destination profile 533 among the destination profiles 533 stored in the storage section 53. When the profile manual setting button 96 is set to ON, the user specifies any destination profile 533.

The filtering setting area 97 is an area to set whether or not to activate the filtering function and to set the filtering condition when filtering function is active. As types of filtering conditions, there are, "paper type is completely same", "paper category is same", "paper color is same", "gloss is same", "basis weight is same", etc. The user specifies no filtering or specifies the filtering condition when the destination profile 533 is narrowed down in the filtering setting area 97 by operation on the operating section 34.

The CMYK profile setting area 98 is an area to display one or a plurality of destination profiles 533 so as to be selectable. When the filtering function is active, one or a plurality of destination profiles 533 which match the filtering condition specified on the filtering setting area 97 are displayed in the CMYK profile setting area 98 so as to be selectable. When the filtering function is not active, all of the destination profiles 533 stored in the storage section 53 are displayed in the CMYK profile setting area 98 so as to be selectable. The user specifies any one of the destination profiles 533 from one or the plurality of destination profiles 533 in the CMYK profile setting area 98 by operation of the operating section 34.

As described above, by utilizing the filtering function, the user can easily select the paper type destination profile 533 which is a match or approximation with the paper type used from the list displayed in the CMYK profile setting area 98.

The color conversion setting screen 351 realizes the filtering function by a list box, and alternatively, the setting can be more detailed by combining a radio button or check box. Also, the searching precision can be enhanced by item other than paper type, for example, date and time of creation, creator information, etc.

Further, if the space on the screen allows, the paper type information for all of the destination profiles 533 can be displayed based on the paper type information embedded in the destination profile 533 when the list of the destination profile 533 is displayed.

After step S21, the CPU 31 sets the source profile 532 based on operation on the operating section 34 by the user (step S22). Specifically, the CPU 31 sets the source profile 532 specified in the RGB profile setting area 93 and the CMYK profile setting area 94 of the color conversion setting screen 351.

Next, the CPU 31 judges whether or not the profile automatic setting of the destination profile 533 is set to ON by the profile automatic setting button 95 of the color conversion setting screen 351 (step S23). When the profile automatic setting of the destination profile 533 is set to ON (step S23; YES), the CPU 31 sets the profile automatic setting of the color conversion setting information to active (step S24).

In step S23, when the profile automatic setting of the destination profile 533 is set to OFF (step S23; NO), in other words, when the profile manual setting of the destination profile 533 is set to ON by the profile manual setting button 96 of the color conversion setting screen 351, the user selects any of the destination profiles 533. Here, the CPU 31 judges whether or not the filtering function of the destination profile 533 is active (step S25). Specifically, the CPU 31 judges whether or not the filtering condition is specified on the filtering setting area 97 of the color conversion setting screen 351.

When the filtering function of the destination profile 533 is active (step S25; YES), the CPU 31 obtains all of the destination profiles 533 (profile group) stored in the storage section 53 of the controller 5a (step S26). Specifically, the CPU 31 transmits an obtaining request of the destination profile 533 through the communication section 36 to the controller 5a and obtains the destination profile 533 transmitted from the controller 5a through the communication section 36. Next, the CPU 31 sequentially extracts the paper type information embedded in each of the destination profiles 533 of the obtained profile group (step S27).

Then, the CPU 31 compares each of the paper type information extracted from each of the destination profiles 533 with the paper type information showing the paper type of printing, and extracts one or a plurality of the destination profiles 533 which match the filtering condition specified in the filtering setting area 97 of the color conversion setting screen 351 by the user in relation with the paper type information showing paper type of printing from the obtained plurality of destination profiles 533. For example, when "paper type is completely same" is specified as the filtering condition, the CPU 31 extracts the destination profile 533 where the paper type information extracted from the destination profile 533 completely matches the paper type information showing the paper type of printing from the plurality of destination profiles 533 stored in the storage section 53. Also, when "paper color is same" is specified as the filtering condition, the CPU 31 extracts the destination profile 533 where the paper color of the paper type information extracted from the destination profile 533 matches the paper color of the paper of printing from the plurality of destination profiles 533 stored in the storage section 53. Then, the CPU 31 displays in a list the extracted one or a plurality of destination profiles 533 in the CMYK profile setting area 98 of the color conversion setting screen 351 so as to be selectable (step S28).

In step S25, when the profile of the filtering function is not active (step S25; NO), in other words, when no filtering is specified in the filtering setting area 97 of the color conversion setting screen 351, the CPU 31 obtains all of the destination profiles 533 (profile group) stored in the storage section 53 of the controller 5a (step S29), and the obtained destination profile 533 is displayed in a list in the CMYK profile setting area 98 of the color conversion setting screen 351 so as to be selectable (step S30).

After step S28 or step S30, the CPU 31 sets the destination profile 533 to be applied from the destination profiles 533 displayed as a list on the display section 35 based on operation on the operating section 34 by the user (step S31).

After step S24 or step S31, the color conversion setting is registered (step S32) and the color conversion setting processing ends. The registration of the color conversion setting is to create color conversion setting information with the set content. The printing setting information of the printing data transmitted to the controller 5a when printing is instructed includes paper type information to show paper type of printing and color conversion setting information.

Figure 11:
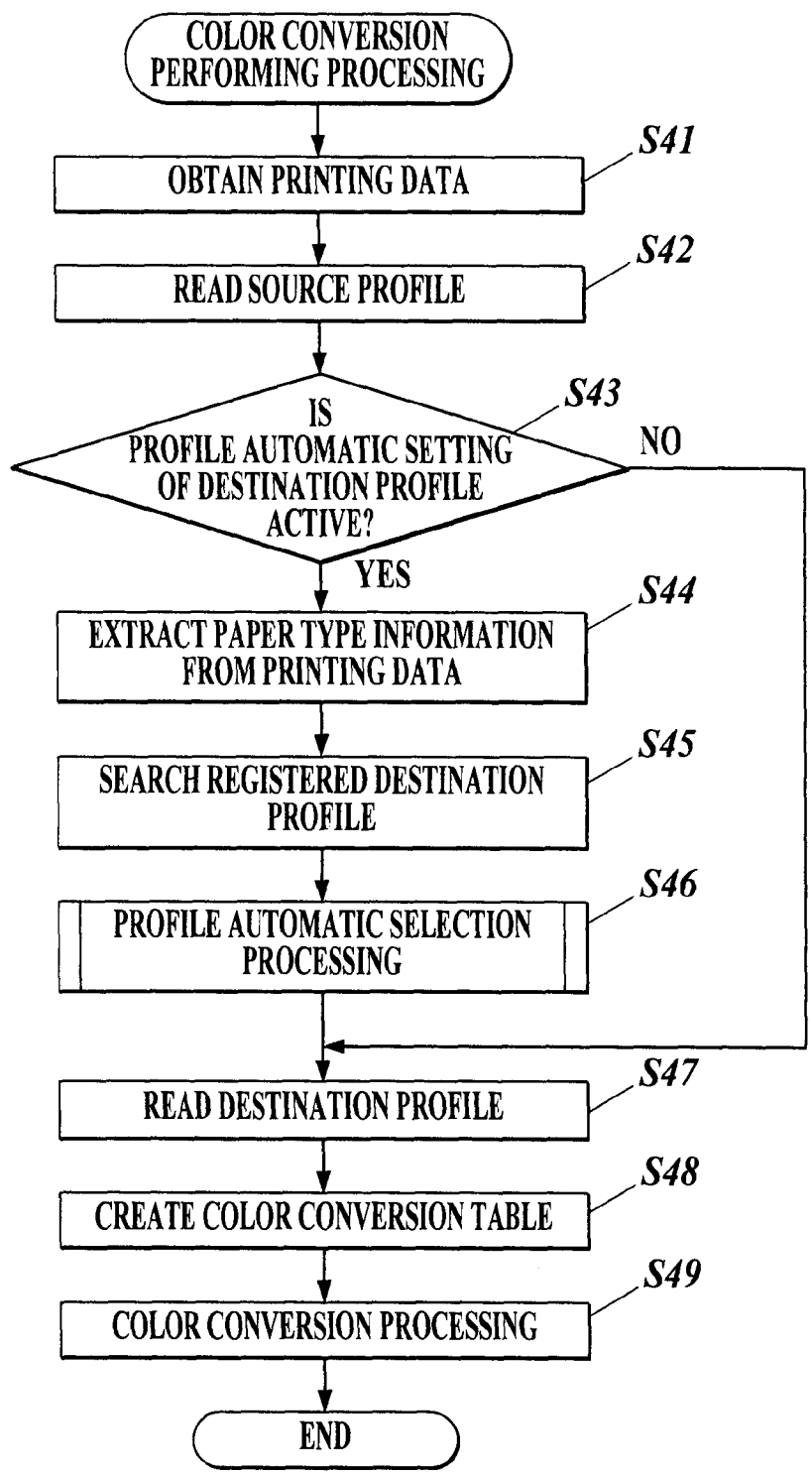
FIG. 11 is a flowchart showing a color conversion performing processing performed on the controller.

FIG. 11 shows a flowchart of the color conversion performing processing performed in the controller 5a. Here, an example where the controller 5a receives printing data from the printing instruction terminal 3a is described. The same is applied when the controller 5a receives printing data from the printing instruction terminals 3b and 3c or when the controller 5b receives printing data from the printing instruction terminals 3a, 3b and 3c. The color conversion performing processing is realized by the CPU 51 by software processing in conjunction with the printer controller program 531 stored in the storage section 53.

First the CPU 51 obtains printing data from the printing instruction terminal 3a through the communication section 56 (step S41).

Next, the CPU 51 reads the set source profile 532 from the storage section 53 to the RAM 52 based on the color conversion setting information of the obtained printing data (step S42).

Next, the CPU 51 judges whether or not the profile automatic setting of the destination profile 533 is active based on the color conversion setting information (step S43). When the profile automatic setting of the destination profile 533 is active (step S43; YES), the CPU 51 extracts paper type information showing paper type of printing from the printing data (step S44). The extracted paper type information is stored in the RAM 52 by the CPU 51.

Next, the CPU 51 searches the registered destination profile 533 stored in the storage section 53 (step S45). Then, the CPU 51 performs the profile automatic selection processing (step S46).

Figure 12:
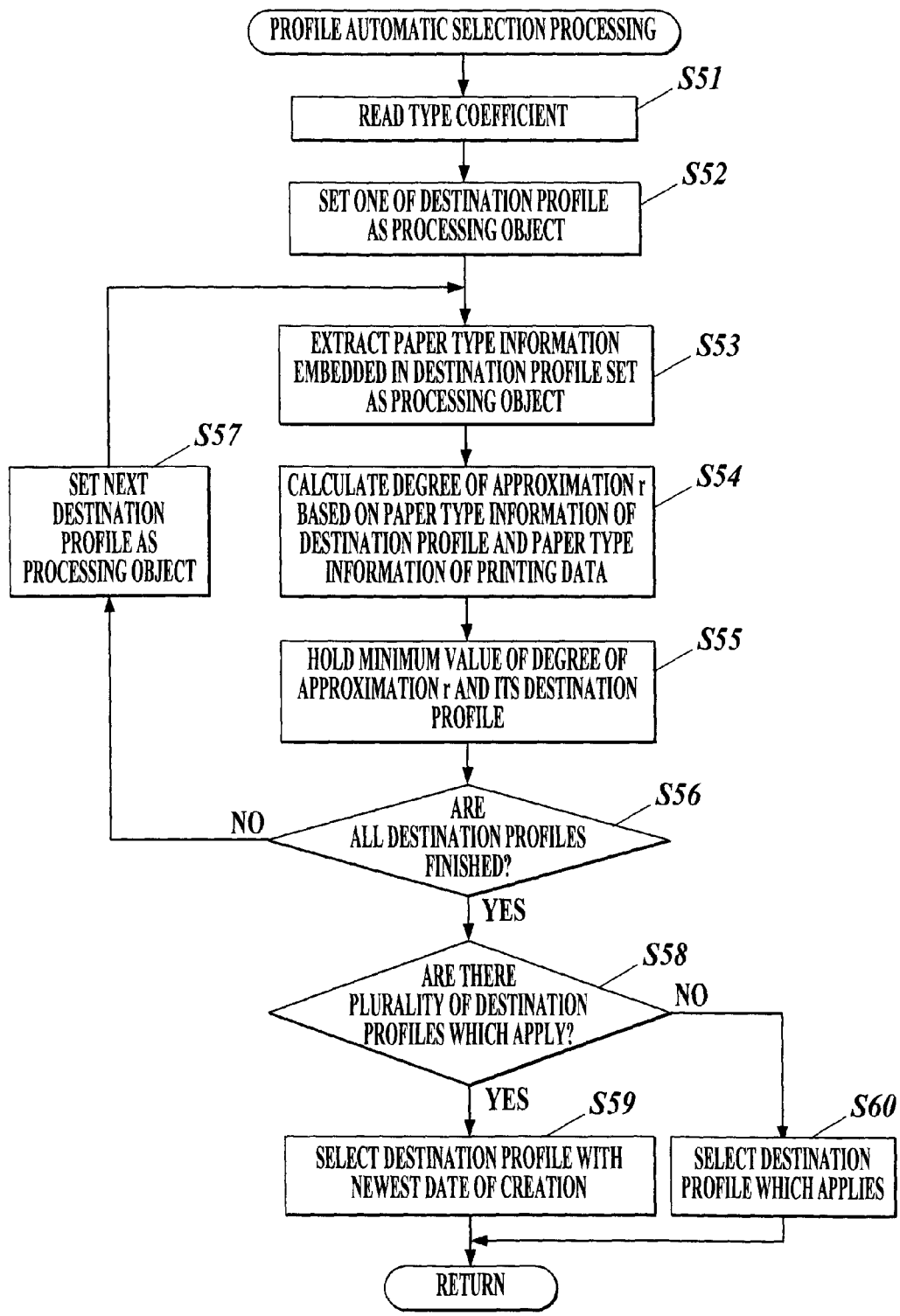
FIG. 12 is a flowchart showing a profile automatic selection processing.

Here, the profile automatic selection processing is described with reference to FIG. 12.

First, the CPU 51 reads the type coefficient stored in advance in the storage section 53 to the RAM 52 (step S51).

The type coefficient represents how much each element of the paper type information influences the color reproduction (image quality).

Table 5 shows the type coefficient corresponding to each element.

TABLE 5

| | ELEMENT | | | |
| --- | --- | --- | --- | --- |
| | PAPER CATEGORY | PAPER COLOR | GLOSS | BASIS WEIGHT |
| TYPE COEFFICIENT | 100 | 100 | 10 | 1 |

The example shown in Table 5 shows that among the elements, the paper category and the paper color have the largest influence on the color reproduction followed by the gloss and the basis weight influencing on the color reproduction in this order. The type coefficient depends on the engine attribute of the printer and therefore there is a need to consider the value of the suitable type coefficient beforehand. As a method of consideration, the following method can be used. The same color chart without color correction can be output for each element of consideration and an average of the color difference ($\Delta E_{ab}$, $\Delta E_{94}$, $\Delta E_{00}$, etc.) between a certain reference (for example, printing target) can be calculated to compare the distribution (in the above described example, distribution of the average of the color difference among the four types of paper categories, three types of paper colors, two types of gloss, five types of basis weight) among the elements. The larger the distribution is, it is clear that the influence to the color reproduction is large, and the type coefficient of the element is taken largely.

Next, the CPU 51 sets one of the destination profiles 533 among all of the destination profiles 533 stored in the storage section 53 as the processing object (step S52). The CPU 51 extracts the paper type information embedded in the destination profile 533 as the processing object (step S53). The extracted paper type information is stored in the RAM 52 by the CPU 51.

Next, the CPU 51 calculates the degree of approximation r based on the paper type information extracted from the destination profile 533 as the processing object and the paper type information extracted from the printing data (step S54). The degree of approximation r is defined by the following Formula (1).

[Formula (1)]

$$r = \sum_{n=1}^{factor} (C_n |p_n - p'_n|) \quad (1)$$

Here, Cn is the type coefficient of an element n, $p_n$ is an attribute code of the element n included in the paper type information extracted from the destination profile 533 and $p'_n$ is an attribute code of the element n included in the paper type information extracted from the printing data. "n" is a number of the element used in the paper type judgment and in the above described example, up to 4 are present. The smaller the degree of approximation r is, the closer the two types of paper types are, and when the degree of approximation r is 0, the two types of paper types match.

Then, the CPU 51 holds the minimum value of the degree of approximation r calculated up to this point and the destination profile 533 in the RAM 52 (step S55).

Next, the CPU 51 judges whether or not the processing of all of the destination profiles 533 stored in the storage section 53 are finished or not (step S56). When there is a destination profile 533 on which the processing is not finished among all of the destination profiles 533 stored in the storage section 53 (step S56; NO), the CPU 51 sets the next destination profile 533 as the processing object (step S57) and returns to step S53. Then, the processing from step S53 to step S56 is repeated.

In step S56, when processing of all of the destination profiles 533 stored in the storage section 53 is finished (step S56; YES), the CPU 51 judges whether or not there are a plurality of destination profiles 533 which apply (destination profile 533 held in the RAM 52 as having a minimum degree of approximation r) (step S58).

When there are a plurality of destination profiles 533 which apply (step S58; YES), the CPU 51 selects the destination profile 533 with the newest date and time of creation (step S59). When there is only one destination profile 533 which applies (step S58; NO), this destination profile 533 is selected (step S60). As described above, the CPU 51 uses the formula (1) to compare the paper type information extracted from the destination profile 533 with the paper type information extracted from the printing data of the color conversion object and selects the destination profile 533 with the smallest degree of approximation r. After step S59 or step S60, the processing advances to step S47 shown in FIG. 11.

Next, returning to FIG. 11, the CPU 51 reads the destination profile 533 selected by the profile automatic selection processing from the storage section 53 to the RAM 52 (step S47).

When the profile automatic setting of the destination profile 533 is not active in step S43 (Step S43; NO), in other words, when the destination profile 533 is set manually, the CPU 51 reads the destination profile 533 set in the color conversion setting information from the storage section 53 to the RAM 52 (step S47).

Next, the CPU 51 uses the source profile 532 read in step S42 and the destination profile 533 read in step S47 to create the color conversion table used in the color conversion processing (step S48). Then, the CPU 51 performs the color conversion processing on the printing data based on the created color conversion table (step S49).

With this, the color conversion performing processing ends.

As described above, according to the first embodiment, in the profiler 2, the output condition information such as paper type information is embedded in the color conversion profile 232 and therefore when the color conversion profile 232 is used later, the color conversion profile 232 suitable for the output condition can be selected.

Also, when the profiler 2 obtains the output condition information automatically from the controller 5a and 5b, error of input can be prevented.

Also, the profiler 2 can obtain the output condition information input from the operating section 24.

Also, in the profiler 2, the output condition information such as the paper type information is described in the private tag 84 of the ICC profile 80 and the output condition information can be easily embedded in the ICC profile 80.

Also, in the printing instruction terminal 3a, 3b and 3c, when the filtering function is used, one or the plurality of destination profiles 533 (color conversion profiles) which match to the filtering condition can be displayed on the display section 35 so as to be selectable to support the selection of the destination profile 533 by the user. For example, in the printing instruction terminals 3a, 3b and 3c, one or the plurality of destination profiles 533 which match to the filtering condition can be extracted based on the paper type information. Therefore, when the destination profile 533 is used, the destination profile 533 suitable for the output condition of printing can be selected.

Also, on the controller 5a and 5b, when the destination profile 533 (color conversion profile) is used, the destination profile 533 suitable for the output condition such as paper type of printing can be selected. Specifically, the destination profile 533 embedded with the output condition information with the closest approximation with the output condition information extracted from the printing data can be selected.

As described above, in the controllers 5a and 5b, the color conversion processing according to the output condition of printing can be performed automatically, and consequently, there is no need to prepare in advance the destination profile 533 with respect to each output condition.

Also, the output condition information is embedded in the destination profile 533 (device profile) and therefore, when a profile of a device link profile format is created using the device profile, the output condition information can be utilized continuously.

Also, when two or more controllers are connected to one printer or there are two or more pairs of a printer and a controller of the same model (setting of paper type, screen type, etc. are the same) the color conversion profile (destination profile) stored in one controller can be copied to the other controller so that the copied color conversion profile can be used by the other controller. Other than the color conversion processing, calibration to calibrate the daily motion of the printer engine are performed separately.

Second Embodiment

Next, the second embodiment of the preferred embodiments is described.

The printing system of the second embodiment is a configuration similar to that of the printing system 100 of the first embodiment, and therefore, FIG. 1 to FIG. 4 are referred to and the illustration and description of the configuration is omitted. The characteristic configuration and processing of the second embodiment are described below.

The profile creating processing (see FIG. 5) performed in the profiler 2, the color conversion setting processing (see FIG. 9) performed in the printing instruction terminals 3*a*, 3*b* and 3*c*, and the color conversion performing processing (see FIG. 11 and FIG. 12) performed in the controllers 5*a* and 5*b* are similar to the first embodiment, and therefore the description is omitted.

The printing system of the second embodiment is different from the printing system 100 of the first embodiment in that the color conversion profile 232 created in the profiler 2 is a structured document file. Here, an example where an XML (Extensible Markup Language) file is created as a structured document file and paper type information showing paper type of the paper on which the color chart is output is used as the output condition information showing the output condition when the color chart is output is described.

Figure 13:
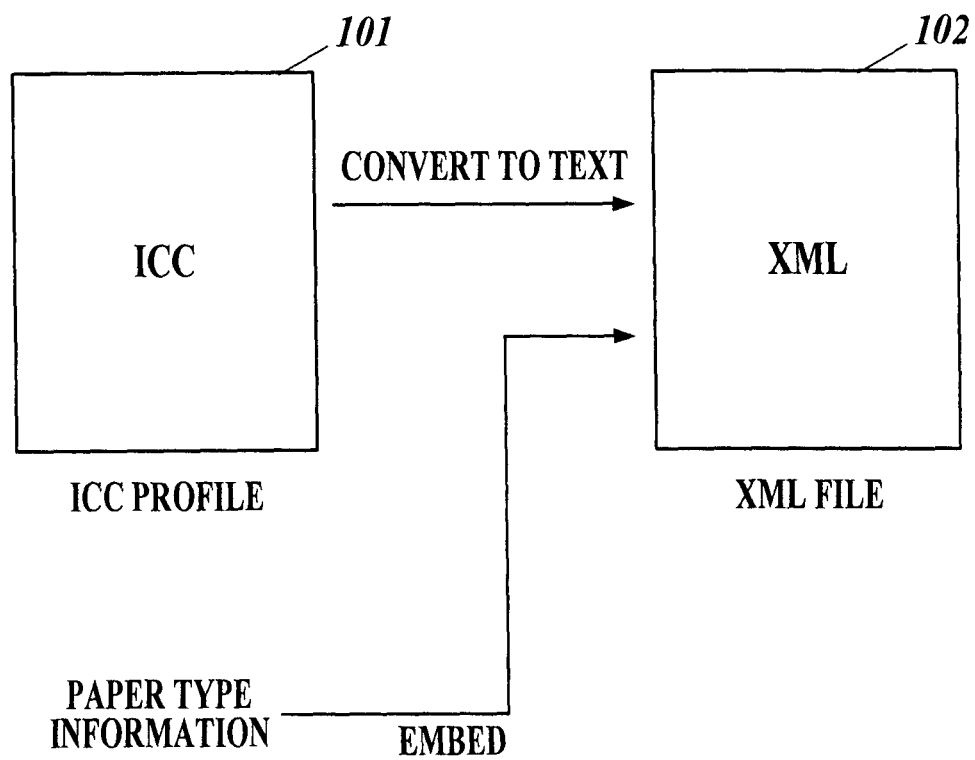
FIG. 13 is a diagram showing a process of creating a color conversion profile on the profiler of the second embodiment.

FIG. 13 shows a creating procedure of the color conversion profile 232 in the profiler 2 of the second embodiment. The CPU 21 converts the ICC profile 101 representing the color reproduction characteristic of the printers 4*a* and 4*b* into text and describes the text ICC profile and the paper information in the XML file 102. In other words, the CPU 21 embeds the paper type information in an XML file 102.

FIG. 14 shows an example of a description of the XML file 102. The ICC profile is described by converting the ICC profile to a string of text characters such as Base 64 format in the tag 103 to describe the ICC profile in the XML file 102. Also, the paper type information is described as text information of "category=1, color=1, gloss=2, weight=3" in the tag 104 to describe paper type information in the XML file 102. This shows the paper category is "plain paper", the paper color is "white", the gloss is "no gloss" and the basis weight is "91 to 120". The corresponding relation between the attribute of each element and attribute code is similar to that of the first embodiment (see Table 1 to Table 4). In other words, in the second embodiment, the paper type information is embedded in the XML file 102 by describing the attribute corresponding to the elements of the paper type information with the attribute code in the tag 104 to describe the paper type information in the XML file 102.

According to the second embodiment, the profiler 2 describes the paper type information showing the paper type of the paper on which the color chart is output in the tag 104 to describe the paper type information in the XML file 102. Consequently, the paper type information can be easily embedded in the XML file 102.

When the filtering function is used in the printing instruction terminals 3*a*, 3*b* and 3*c*, the paper type information is obtained by referring to the tag 104 in the XML file 102 and therefore, one or a plurality of XML file 102 which matches to the filtering condition can be extracted and displayed so as to be selectable.

When the profile automatic selection processing is performed in the controllers 5*a* and 5*b*, the paper type information is obtained by referring to the tag 104 in the XML file 102 and the XML file 102 suitable for the paper type which is used in printing can be selected.

Third Embodiment

Next, the third embodiment of the preferred embodiments is described.

The printing system of the third embodiment is a configuration similar to that of the printing system 100 of the first embodiment, and therefore FIG. 1 to FIG. 4 is referred and the illustration and the description of the configuration is omitted. The characteristic configuration and processing of the third embodiment is described below.

The profile creating processing (see FIG. 5) performed in the profiler 2, the color conversion setting processing (see FIG. 9) performed in the printing instruction terminals 3*a*, 3*b* and 3*c*, and the color conversion performing processing performed in the controllers 5*a* and 5*b* (see FIG. 11 and FIG. 12) are similar to the first embodiment, and therefore the description is omitted.

The printing system of the third embodiment is different from the printing system 100 of the first embodiment in that the file name of the color conversion profile 232 created in the profiler 2 includes the output condition information. Here, an example where the paper type information showing the paper type of the paper on which the color chart is output is used as the output condition information showing the output condition of the color chart output is described.

The CPU 21 of the profiler 2 includes the paper type information in the file name of the color conversion profile 232 to embed the paper type information in the color conversion profile 232. For example, the CPU 21 names the file name of the color conversion profile 232 to "*_category1_color1_gloss2_weight 3.icc". This shows the paper category is "plain paper", the paper color is "white", the gloss is "no gloss" and the basis weight is "91 to 120". The corresponding relation between the attribute of each element and the attribute code is similar to that of the first embodiment (see Table 1 to Table 4). The "*" portion of the file name is the name specified by the user. In other words, in the third embodiment, the file name of the color conversion profile 232 includes the attribute code showing the attribute corresponding to each element of the paper type information to embed the paper type information in the color conversion profile 232.

According to the third embodiment, the profiler 2 includes the paper type information showing the paper type of the paper to output the color chart with the file name of the color conversion profile 232 to easily embed the paper type information in the color conversion profile 232.

When the filtering function is used in the printing instruction terminals 3a, 3b and 3c, by referring to the file name of the destination profile 533 (color conversion profile 232) to obtain the paper type information, one or a plurality of destination profiles 533 which match the filtering condition are extracted to enable display and a selection can be made.

When the profile automatic selection processing is performed in the controllers 5a and 5b, by referring to the file name of the destination profile 533 (color conversion profile 232) to obtain the paper type information, the destination profile 533 suitable for the paper type used in printing can be selected.

The descriptions of the above described embodiments are an example of the information processing apparatus of the present embodiment, and the embodiments are not limited to those described above. The specific configuration and operation of each section composing the information processing apparatus can be suitably modified without leaving the scope of the invention.

For example, in the descriptions of the above embodiments, the paper type information showing the paper type of the paper on which the color chart is output is used as the output condition information showing the output condition when the color chart is output, and the paper type information showing the paper type of the paper which is the object of printing is used as the output condition information showing the output condition in printing. Alternatively, as the output condition information showing the output condition when the color chart is output and the output condition information showing the output condition of printing, if the information influences color reproduction, other information can be used, such as screen type in screening processing, individual identification number of the printers 4a and 4b, temperature and humidity, and the like.

The above description discloses an example using a storage device such as a nonvolatile semiconductor memory, hard disk drive, etc. as a computer readable medium storing the program performed by the processing, however the embodiment is not limited to the above examples. As other computer readable medium, portable recording medium such as a CD-ROM, etc. can be applied. Also, a carrier wave can be applied as a medium to provide data of a program through a communication line.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

According to an aspect of the preferred embodiments of the present invention, there is provided an information processing apparatus including a control section to obtain output condition information to show an output condition when a color chart is output, to obtain colorimetric data obtained by measuring the color chart, to create a color conversion profile based on the obtained colorimetric data, and to embed the output condition information in the created color conversion profile according to an order determined in advance.

According to the above aspect, in the information processing apparatus, the color conversion profile is embedded in the output condition information and a color conversion profile suitable for the output condition can be selected when the color conversion profile is used later.

Preferably, in the information processing apparatus, the output condition information further includes the paper type information to show the paper type of the paper on which the color chart is output.

Consequently, in the information processing apparatus, the color conversion profile can be embedded in the paper type information.

Preferably, the information processing apparatus further includes:

a communication section to perform transmitting and receiving of data with an external apparatus, wherein the control section obtains the output condition information from the external apparatus through the communication section.

Consequently, in the information processing apparatus, the output condition information is obtained from an external apparatus, and therefore error of input can be prevented.

Preferably, the information processing apparatus further includes:

an operating section to receive operation input by a user, wherein the control section obtains the output condition information by input from the operating section.

Consequently, in the information processing apparatus, the output condition information input from the operating section can be obtained.

Preferably, in the information processing apparatus, the color conversion profile is an ICC profile; and the control section describes the output condition information in the private tag in the ICC profile to embed the output condition information in the ICC profile.

Consequently, in the information processing apparatus, the output condition information can be described in the private tag in the ICC profile to easily embed the output condition information in the ICC profile.

Preferably, the information processing apparatus, the color conversion profile is a structured document file; and the control section describes the output condition information in the tag for describing the output condition information in the structured document file to embed the output condition information in the structured document file.

Consequently, in the information processing apparatus, the output condition information is described in the tag to describe the output condition information in the structured document file to easily embed the output condition information in the structured document file.

Preferably, in the information processing apparatus, the control section includes the output condition information in the file name of the color conversion profile to embed the output condition information in the color conversion profile.

Consequently, in the information processing apparatus, the output condition information is included in the file name of the color conversion profile to easily embed the output condition information in the color conversion profile.

According to an aspect of the preferred embodiments of the present invention, there is provided an information processing apparatus including:

a control section to obtain a plurality of color conversion profiles embedded with first output condition information to show output condition when a color chart is output according to an order determined in advance, to extract first output condition information from each one of the obtained plurality of color conversion profiles, to compare the extracted first output condition information with second output condition information to show output condition of printing, to extract one or a plurality of color conversion profiles which match a filtering condition determined in advance from the obtained plurality of color conversion profiles, and to display the extracted one or a plurality of color conversion profiles on the display section so as to be selectable.

According to the above aspect, in the information processing apparatus, the color conversion profile suitable for the output condition of printing can be selected when using the color conversion profile.

Preferably, in the information processing apparatus, the first output condition information includes paper type information to show paper type of the paper on which the color chart is output; and the second output condition information includes paper type information to show the paper type of the paper which is an object of printing.

Consequently, in the information processing apparatus, one or a plurality of color conversion profiles which match the filtering condition can be extracted based on the paper type information.

According to an aspect of the preferred embodiments of the present invention, there is provided an information processing apparatus including:

a storage section to store a plurality of color conversion profiles embedded with first output condition information according to an order determined in advance to show an output condition when a color chart is output; and a control section to obtain printing data including second output condition information to show output condition in printing, to extract second output condition information from the printing data, to extract first output condition information from each of the plurality of color conversion profiles, to compare the first output condition information extracted from the plurality of color conversion profiles with the second output condition information extracted from the printing data, and to select a color conversion profile to be applied from the plurality of color conversion profiles.

According to the above aspect, in the information processing apparatus, the color conversion profile suitable for the output condition of printing can be selected when using the color conversion profile.

Preferably, in the information processing apparatus, the control section determines first output condition information with a closest approximation to the second output condition information extracted from the printing data from the first output condition information extracted from the plurality of color conversion profiles to select a color conversion profile to be applied.

Consequently, in the information processing apparatus, the color conversion profile embedded with the first output condition information which is the closest approximation to the second output condition information extracted from the printing data can be selected.

Preferably, in the information processing apparatus, the first output condition information includes paper type information to show paper type of paper on which the color chart is output; and the second output condition information includes paper type information to show paper type of paper which is an object of printing.

Consequently, in the information processing apparatus, the color conversion profile suitable for the paper type used in printing can be selected.

According to an aspect of the preferred embodiments of the present invention, there is provided a computer readable medium embodying a program to allow a computer to function as:

a control section to obtain output condition information to show an output condition when a color chart is output, to obtain colorimetric data obtained by measuring the color chart, to create a color conversion profile based on the obtained colorimetric data, and to embed the output condition information in the created color conversion profile according to an order determined in advance.

According to the above aspect, in the computer readable medium, the output condition information is embedded in the color conversion profile, therefore, when the color conversion profile is used later, the color conversion profile suitable for the output condition can be selected.

According to an aspect of the preferred embodiments of the present invention, there is provided a computer readable medium embodying a program to allow a computer to function as:

a control section to obtain a plurality of color conversion profiles embedded with first output condition information to show output condition when a color chart is output according to an order determined in advance, to extract first output condition information from each one of the obtained plurality of color conversion profiles, to compare the extracted first output condition information with second output condition information to show output condition of printing, to extract one or a plurality of color conversion profiles which match a filtering condition determined in advance from the obtained plurality of color conversion profiles, and to display the extracted one or a plurality of color conversion profiles on the display section so as to be selectable.

According to the above aspect, in the computer readable medium, when the color conversion profile is used, the color conversion profile suitable for the output condition of printing can be selected.

According to an aspect of the preferred embodiments of the present invention, there is provided a computer readable medium embodying a program to allow a computer to function as:

a storage section to store a plurality of color conversion profiles embedded with first output condition information according to an order determined in advance to show an output condition when a color chart is output; and a control section to obtain printing data including second output condition information to show output condition in printing, to extract second output condition information from the printing data, to extract first output condition information from each of the plurality of color conversion profiles, to compare the first output condition information extracted from the plurality of color conversion profiles with the second output condition information extracted from the printing data, and to select a color conversion profile to be applied from the plurality of color conversion profiles.

According to the above aspect, in the computer readable medium, when the color conversion profile is used, the color conversion profile suitable for the output condition of printing can be selected.

What is claimed is:

1. An information processing apparatus comprising:
 a storage section that stores a plurality of color conversion profiles, each of the plurality of color conversion profiles embedded with a first output condition information; and
 a control section that:
 (a) obtains printing data including a second output condition information;
 (b) extracts the second output condition information from the printing data;
 (c) extracts the first output condition information from each of the plurality of color conversion profiles;

(d) compares the first output condition information extracted from each of the plurality of color conversion profiles with the second output condition information; and (e) selects a color conversion profile from the plurality of color conversion profiles to be applied, wherein the control section compares each first output condition information with the second output condition information by calculating a degree of approximation between the first output condition information and the second output condition information based on a type coefficient of an element of the first and second output condition information, an attribute code of the element included in the first output condition information extracted from each color conversion profile, and an attribute code of the element included in the second output condition information extracted from the printing data, and wherein the control section selects the color conversion profile to be applied by selecting the color conversion profile for which the degree of approximation is smallest.

2. The information processing apparatus of claim 1, wherein the control section calculates the degree of approximation between the first output condition information and the second output condition information according to formula:

$$r = \sum_{n=1}^{factor} (C_n |p_n - p'_n|),$$

wherein:
r is the degree of approximation;
factor is the total number of elements of the first and second output condition information;
n is a number representative of an individual element of the first and second output condition information;
$C_n$ represents the type coefficient of element n;
$p_n$ is the attribute code of element n included in the first output condition information; and
$p'_n$ is the attribute code of element n included in the second output condition information.

3. The information processing apparatus of claim 1, wherein:
the first output condition information is first paper type information; and
the second output condition information is second paper type information.

4. The information processing apparatus of claim 1, wherein:
the color conversion profile is an ICC profile; and
the first output condition information is embedded in the private tag in the ICC profile.

5. The information processing apparatus of claim 1, wherein:
the color conversion profile is a structured document file; and
the first output condition information is embedded in the tag for describing the first output condition information in the structured document file.

6. The information processing apparatus of claim 1, wherein:
the first output condition information is embedded in the file name of the color conversion profile.

7. A method for operating an information processing apparatus comprising the steps of:
(a) storing a plurality of color conversion profiles in a non-transitory computer readable storage medium, each of the plurality of color conversion profiles embedded with a first output condition information;
(b) obtaining printing data including a second output condition information;
(c) extracting the second output condition information from the printing data;
(d) extracting the first output condition information from each of the plurality of color conversion profiles,
(e) comparing the first output condition information extracted from each of the plurality of color conversion profiles with the second output condition information,
(f) selecting a color conversion profile from the plurality of color conversion profiles to be applied, and
(g) printing with a printer using the selected color conversion profile,
wherein comparing each first output condition information with the second output condition information further comprises calculating a degree of approximation between the first output condition information and the second output condition information based on a type coefficient of an element of the first and second output condition information, an attribute code of the element included in the first output condition information extracted from each color conversion profile, and an attribute code of the element included in the second output condition information extracted from the printing data, and
wherein selecting the color conversion profile to be applied comprises selecting the color conversion profile for which the degree of approximation is smallest.

8. The method for operating an information processing apparatus of claim 7, wherein calculating the degree of approximation between the first output condition information and the second output condition information proceeds according to formula:

$$r = \sum_{n=1}^{factor} (C_n |p_n - p'_n|),$$

wherein:
r is the degree of approximation;
factor is the total number of elements of the first and second output condition information;
n is a number representative of an individual element of the first and second output condition information;
$C_n$ represents the type coefficient of element n;
$p_n$ is the attribute code of element n included in the first output condition information; and
$p'_n$ is the attribute code of element n included in the second output condition information.

9. The method for operating an information processing apparatus of claim 7, wherein:
the first output condition information is first paper type information; and
the second output condition information is second paper type information.

10. The method for operating an information processing apparatus of claim 7, wherein:
the color conversion profile is an ICC profile; and
the first output condition information is embedded in the private tag in the ICC profile.

11. The method for operating an information processing apparatus of claim 7, wherein:
the color conversion profile is a structured document file; and
the first output condition information is embedded in the tag for describing the first output condition information in the structured document file.

12. The method for operating an information processing apparatus of claim 7, wherein:
the first output condition information is embedded in the file name of the color conversion profile.

13. An non-transitory computer readable storage medium storing a computer program, which when executed by a computer, performs the following steps:
(a) storing a plurality of color conversion profiles, each of the plurality of color conversion profiles embedded with a first output condition information;
(b) obtaining printing data including a second output condition information;
(c) extracting the second output condition information from the printing data;
(d) extracting the first output condition information from each of the plurality of color conversion profiles,
(e) comparing the first output condition information extracted from each of the plurality of color conversion profiles with the second output condition information, and
(f) selecting a color conversion profile from the plurality of color conversion profiles to be applied,
wherein comparing each first output condition information with the second output condition information further comprises calculating a degree of approximation between the first output condition information and the second output condition information based on a type coefficient of an element of the first and second output condition information, an attribute code of the element included in the first output condition information extracted from each color conversion profile, and an attribute code of the element included in the second output condition information extracted from the printing data, and
wherein selecting the color conversion profile to be applied comprises selecting the color conversion profile for which the degree of approximation is smallest.

14. The non-transitory computer readable storage medium of claim 13, wherein calculating the degree of approximation between the first output condition information and the second output condition information proceeds according to formula:

$$r = \sum_{n=1}^{factor} (C_n |p_n - p'_n|),$$

wherein:
r is the degree of approximation;
factor is the total number of elements of the first and second output condition information;
n is a number representative of an individual element of the first and second output condition information;
$C_n$ represents the type coefficient of element n;
$p_n$ is the attribute code of element n included in the first output condition information; and
$p'_n$ is the attribute code of element n included in the second output condition information.

15. The non-transitory computer readable storage medium of claim 13, wherein:
the first output condition information is first paper type information; and
the second output condition information is second paper type information.

16. The non-transitory computer readable storage medium of claim 13, wherein:
the color conversion profile is an ICC profile; and
the first output condition information is embedded in the private tag in the ICC profile.

17. The non-transitory computer readable storage medium of claim 13, wherein:
the color conversion profile is a structured document file; and
the first output condition information is embedded in the tag for describing the first output condition information in the structured document file.

18. The non-transitory computer readable storage medium of claim 13, wherein:
the first output condition information is embedded in the file name of the color conversion profile.

* * * * *